US012808213B2

(12) United States Patent
Meinhold

(10) Patent No.: US 12,808,213 B2
(45) Date of Patent: Nov. 24, 2026

(54) ROOF ATTACHMENT SYSTEM AND METHOD

(71) Applicant: TAAAZA LLC, Roanoke, IL (US)

(72) Inventor: Todd Meinhold, Roanoke, IL (US)

(73) Assignee: TAAAZA LLC, Roanoke, IL (US)

( * ) Notice: Subject to any disclaimer, the term of this patent is extended or adjusted under 35 U.S.C. 154(b) by 115 days.

(21) Appl. No.: 18/927,000

(22) Filed: Oct. 25, 2024

(65) Prior Publication Data

US 2025/0052080 A1 Feb. 13, 2025

Related U.S. Application Data

(63) Continuation-in-part of application No. 29/836,932, filed on Apr. 29, 2022, now Pat. No. Des. 1,108,668.

(60) Provisional application No. 63/545,690, filed on Oct. 25, 2023.

(51) Int. Cl.
*E04G 21/32* (2006.01)
*A62B 35/00* (2006.01)

(52) U.S. Cl.
CPC ...... *E04G 21/3214* (2013.01); *A62B 35/0043* (2013.01); *E04G 21/3261* (2013.01); *E04G 21/3276* (2013.01); *E04G 21/3295* (2013.01)

(58) Field of Classification Search
CPC ............ E04G 21/3214; E04G 21/3276; E04G 21/3295; E04G 21/3261; A62B 35/0043
USPC ............................ 52/698, 634–636; 248/237
See application file for complete search history.

(56) References Cited

U.S. PATENT DOCUMENTS 530,165 A * 12/1894 Donovan .................. E04G 3/26 52/27
2,815,556 A 12/1957 Neil
4,607,724 A * 8/1986 Hillberg ................ E04G 21/329 182/36
5,137,112 A 8/1992 Nichols
(Continued)

FOREIGN PATENT DOCUMENTS

CA 2450782 6/2005
DE 202007003875 5/2007

OTHER PUBLICATIONS

"How To: Install a temporary roof anchor," accessed on-line at: https://bit.ly/3qMZ7MW (Jul. 8, 2015).
(Continued)

*Primary Examiner* — Brent W Herring
(74) *Attorney, Agent, or Firm* — Barnes & Thornburg LLP

(57) ABSTRACT

Various embodiments of a modular support bracket system including a universal anchor element configured couple with a pair of support structures are described. The anchor element includes a connecting member that extends between first and second coupling members. Each of the first and second coupling members include an opening configured to provide first and second anchor points that an installer can couple a safety line to during the installation, maintenance, or repair. The support structure includes a first truss attachment segment having a base and a support member extending in a substantially perpendicular direction from one end of the base. The first truss attachment segment configured to be secured to the anchor element and a first surface of a first frame member of the roof. A ridge cap can be installed over the bracket system such that the first and second coupling members extend outward from the ridge cap.

18 Claims, 28 Drawing Sheets

(56) References Cited

U.S. PATENT DOCUMENTS

| | | | | |
|---|---|---|---|---|
| 5,143,171 | A | 9/1992 | Glynn et al. | |
| 5,248,021 | A | 9/1993 | Nichols | |
| 5,282,597 | A | 2/1994 | Babcock | |
| 5,287,944 | A | 2/1994 | Woodyard | |
| 5,346,036 | A | 9/1994 | Arisman | |
| 5,553,685 | A | 9/1996 | Cook | |
| 5,595,260 | A | 1/1997 | Jalla | |
| 5,636,704 | A | 6/1997 | Castaneda | |
| 5,687,535 | A | 11/1997 | Rohlf | |
| 5,713,158 | A | 2/1998 | Gibbs | |
| 5,730,407 | A | 3/1998 | Ostrobrod | |
| 5,816,008 | A * | 10/1998 | Hohmann | E04B 1/4178 52/565 |
| 5,845,452 | A | 12/1998 | Pantano | |
| 5,878,534 | A | 3/1999 | Gleave | |
| 5,896,719 | A | 4/1999 | Thornton | |
| 5,927,036 | A * | 7/1999 | Matthews | E04C 3/086 52/696 |
| 6,668,509 | B1 | 12/2003 | Krebs | |
| 6,868,647 | B2 | 3/2005 | Poldmaa | |
| 6,966,531 | B2 | 11/2005 | Curtin | |
| 7,240,770 | B2 | 7/2007 | Mullins et al. | |
| 7,380,373 | B2 | 6/2008 | Crookston | |
| 7,665,248 | B2 | 2/2010 | Blackford | |
| 8,177,027 | B2 | 5/2012 | Borra et al. | |
| 8,292,245 | B2 | 10/2012 | Schindler | |
| 8,448,745 | B2 | 5/2013 | Crookston | |
| 8,636,108 | B2 * | 1/2014 | Foster, Sr. | E04G 21/3276 182/45 |
| 8,997,408 | B2 | 4/2015 | Borra | |
| 9,003,715 | B2 | 4/2015 | Nurdogan | |
| 9,194,129 | B2 | 11/2015 | John | |
| 9,248,323 | B1 | 2/2016 | Larsen | |
| 9,316,008 | B2 | 4/2016 | Poldmaa | |
| 9,327,147 | B2 | 5/2016 | Snider et al. | |
| 9,744,387 | B1 | 8/2017 | Hung | |
| 10,487,511 | B2 | 11/2019 | Lallier | |
| 10,569,110 | B2 | 2/2020 | Gaines | |
| 10,718,125 | B2 | 7/2020 | Lopez | |
| 10,744,353 | B2 | 8/2020 | Ballantyne | |
| 11,306,490 | B1 * | 4/2022 | Blow | E04G 3/265 |
| 2002/0005022 | A1 * | 1/2002 | Matthews | E04B 5/10 52/696 |
| 2003/0108130 | A1 * | 6/2003 | Tucker | F16L 3/133 375/345 |
| 2004/0055233 | A1 | 3/2004 | Showalter | |
| 2006/0059844 | A1 | 3/2006 | Ely | |
| 2006/0156645 | A1 | 7/2006 | Munday et al. | |
| 2006/0289233 | A1 * | 12/2006 | Flaherty | E04G 21/3276 182/45 |
| 2007/0094948 | A1 | 5/2007 | Osborne et al. | |
| 2008/0282641 | A1 * | 11/2008 | Sackett | E04B 7/045 52/715 |
| 2010/0133040 | A1 | 6/2010 | London | |
| 2010/0200330 | A1 | 8/2010 | Crookston | |
| 2011/0314763 | A1 | 12/2011 | Gandellini | |
| 2012/0153090 | A1 * | 6/2012 | Schindler | F16L 3/012 137/355.26 |
| 2012/0222370 | A1 | 9/2012 | Crookston | |
| 2013/0067848 | A1 | 3/2013 | Ferris | |
| 2013/0087669 | A1 | 4/2013 | Daddio | |
| 2014/0123568 | A1 * | 5/2014 | Nurdogan | E04D 13/12 52/173.1 |
| 2014/0144089 | A1 * | 5/2014 | Borra | E04G 21/3214 52/302.1 |
| 2015/0107184 | A1 | 4/2015 | Nichols, Jr. | |
| 2017/0361135 | A1 | 12/2017 | Crookston | |
| 2020/0188710 | A1 | 6/2020 | Roseveare, Jr. | |
| 2020/0392748 | A1 | 12/2020 | Fabbi | |

OTHER PUBLICATIONS

"2815 Super Anchor Safety RetroFit Permanent Roof Anchor," accessed on-line at: https://amzn.to/346lt29 (May 12, 2005).

"Peakworks Roof Anchor Bracket for Fall Arrest System—Connects to Wood Surfaces with Roofing Applications, ANSI and OSHA Compliant, Adjustable Connector Made of Strong, Durable Steel, Red, V8229100," accessed on-line at https://amzn.to/346ltPA (Jun. 24, 2016).

"Peakwords Durable, Reusable, Industrial/Construction Steel Roof Anchor Bracket, Silver, V8229104," accessed on-line at https://amzn.to/3gFC3v2 (Jun. 24, 2016).

"SafeWaze Floating Zinc Plated D-Ring Fall Protection Anchor, Industrial and Construction Use, Concrete or Steel, OSHA/ANSI Compliant (FS888)" accessed on-line at: https://amzn.to/3qY3d50 (Jun. 11, 2018).

"Malta Dynamics Galvanized Roof Anchor 18" Standard, OSHA/ANSI Compliant," accessed on-line at: https://amzn.to/2JV0KYi (Dec. 20, 2015).

"Qualcraft 2500 Adjustable Roofing Bracket," accessed on-line at: https://amzn.to/3gCINtr (Nov. 8, 1999).

"HitchClip Roof Anchor—SAFE," accessed on-line at: https://bit.ly/2IDMW3F (Apr. 22, 2014).

"Guardian Fall Protection 00300 SH-00 Skymask Skyhook Roof Anchor Fits Flat Pitch Roof," accessed on-line at: https://amzn.to/3oNB4M5 (Sep. 13, 2010).

"3M DBI-SALA 2103670 U-Bolt Roof Anchor (Permanent), Fits Up To 2×8, Silver," accessed on-line at: https://amzn.to/2JN4ZoV (Jan. 6, 2005).

International Search Report and Written Opinion issued to PCT/US/56185, mailed Jan. 29, 2021 (13 pages).

* cited by examiner

ROOF ATTACHMENT SYSTEM AND METHOD

CROSS-REFERENCE TO RELATED APPLICATIONS

This application: (i) is a continuation-in-part of U.S. Design patent application Ser. No. 29/836,932, filed Apr. 29, 2022, and (ii) claims the benefit of and priority to U.S. Provisional Patent Application No. 63/545,690, filed Oct. 25, 2023, both of which are incorporated by reference herein in their entirety for all purposes. Additionally, U.S. patent application Ser. Nos. 11/203,881 and 17/555,622 and U.S. Provisional Patent Applications Nos. 62/890,005 and 62/916,196 are hereby incorporated by reference in its entirety for all purposes.

TECHNICAL FIELD

The invention relates to roof attachment systems and methods of using the same during the installation, maintenance, or repair of a roof on a commercial or residential building structure. The roof attachment system and method includes an adjustable and modular support bracket assembly that provides a secure anchor point that a person, such as an installer, can couple a safety harness to during the installation, maintenance, or repair of the roof.

BACKGROUND OF THE INVENTION

Conventional roofs for commercial buildings and residential structures (e.g., single-family homes and multi-family units like condominiums and townhomes) vary in design and composition. Nonetheless, conventional roofs suffer from a number of shortcomings. For example, conventional roofs can be difficult and in some circumstances, dangerous to install, maintain, or repair, especially in inclement weather conditions (e.g., rain, snow, cold, hail, high humidity, high winds or combinations thereof) because of their very nature, roofs are elevated a significant distance above the ground. Thus, conventional roofs can be dangerous to install, maintain, or repair because they present appreciable fall and injury risks to installers and maintenance personnel. Because the fall and injury risks are appreciable, local, state and federal regulatory bodies have enacted stringent codes and regulations to address and minimize these risks. Compliance with these codes and regulations by architects, developers, builders and the installation crew requires careful consideration starting at the planning and design stages of the building structure. Furthermore, compliance with the codes and regulations, including in the field during the construction process, requires of expensive design and installation resources, which are necessary to avoid detrimental actions from the regulatory bodies. Accordingly, there is an unmet need for a roof attachment system that an installer or maintenance worker may use to aid in the installation and/or maintenance of the roof.

SUMMARY OF THE INVENTION

The present disclosure provides a roof attachment system and methods of using the same during both the installation of a roof on a commercial or residential building. The systems and methods can also be used during maintenance and repair of the roof and/or building over its lifetime. The roof attachment system and the related methods of using and implementing the system include an adjustable and modular support bracket assembly or anchor. The roof attachment system enables the installer to utilize the support bracket during the process of installing the roof and after the roof has been installed.

The attachment system includes a support bracket that is configured to be permanently attached to an extent of the roof of the building structure. In the illustrated embodiment, the support bracket includes an anchor element and a pair of truss attachment assemblies, where the anchor element includes first and second coupling members on opposed ends. Each truss attachment assembly includes a first truss attachment segment and a second truss attachment segment. The support bracket is configured to be coupled to a frame member of the roof, wherein a ridge cap can be installed over a substantial portion of the support bracket(s) and coupling members of the support bracket extend outward of the ridge cap and are thereby exposed.

In various embodiments, the anchor element has a connecting member that extends between first and second coupling members. The connecting member has a midpoint apex and two arms that extend symmetrically from the apex. Each arm has an anchor slot configured to couple with a first truss attachment segment. Each of the first and second coupling members having an opening formed there through, wherein said opening is configured to provide a first anchor point that an installer can couple a safety line to during the installation, maintenance, or repair. The anchor element configured to be manually adjusted or bent at the apex to match the roof pitch.

The first truss attachment segment has a base and a support member extending in a substantially perpendicular direction from one end of the base. The base having a plurality of securement openings and at least one attachment slot formed there through, wherein each of said openings are configured to receive an elongated fastener to secure said first truss attachment segment to a first surface of a first frame member of the roof. The support member has an anchor protrusion at a distal end of the support member configured to be received into an anchor slot of the anchor element. Together, the anchor element and a pair of first truss attachment segments form at least a portion of the support bracket. The base and support member of each first truss attachment segment and extents of the anchor element on each side form channels to receive an extent of the adjacent shingles or panels and an extent of (i) an adjacent purlin, or (ii) roof sheathing, depending upon the roof configuration. In some embodiments, the first truss attachment segment includes an offset.

In some embodiments, the second truss attachment segment has at least one attachment protrusion and a plurality of securement openings formed there through, wherein the at least one attachment protrusion configured to couple with the at least one attachment slot of the first truss attachment segment, and each of said openings are configured to receive an elongated fastener to secure the second truss attachment segment to a second surface of a first frame member of the roof. In some embodiments, the first and second truss attachment segments are integrally formed.

In this manner, the roof attachment system facilitates the installation, maintenance or repair by an installer or technician while also helping to reduce the chances that the installer or technician experiences a fall from the roof. Other features and advantages of the roof attachment system and methods of using same will be apparent from the following disclosure taken in conjunction with the following figures.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes a number of embodiments in many different forms, particular embodiments will be described in greater detail with the understanding that the present disclosure is to be considered as an exemplification of the principles of the disclosed methods and systems, and is not intended to limit the broad aspects of the disclosed concepts to the embodiments illustrated. As will be realized, the subject technology is capable of other and different configurations, several details are capable of modification in various respects, embodiments may be combine, steps for installation may be omitted or performed in a different order, all without departing from the scope of the subject technology. Accordingly, the drawings and detailed description are to be regarded as illustrative in nature and not as restrictive.

1. Introduction

Figure 1:
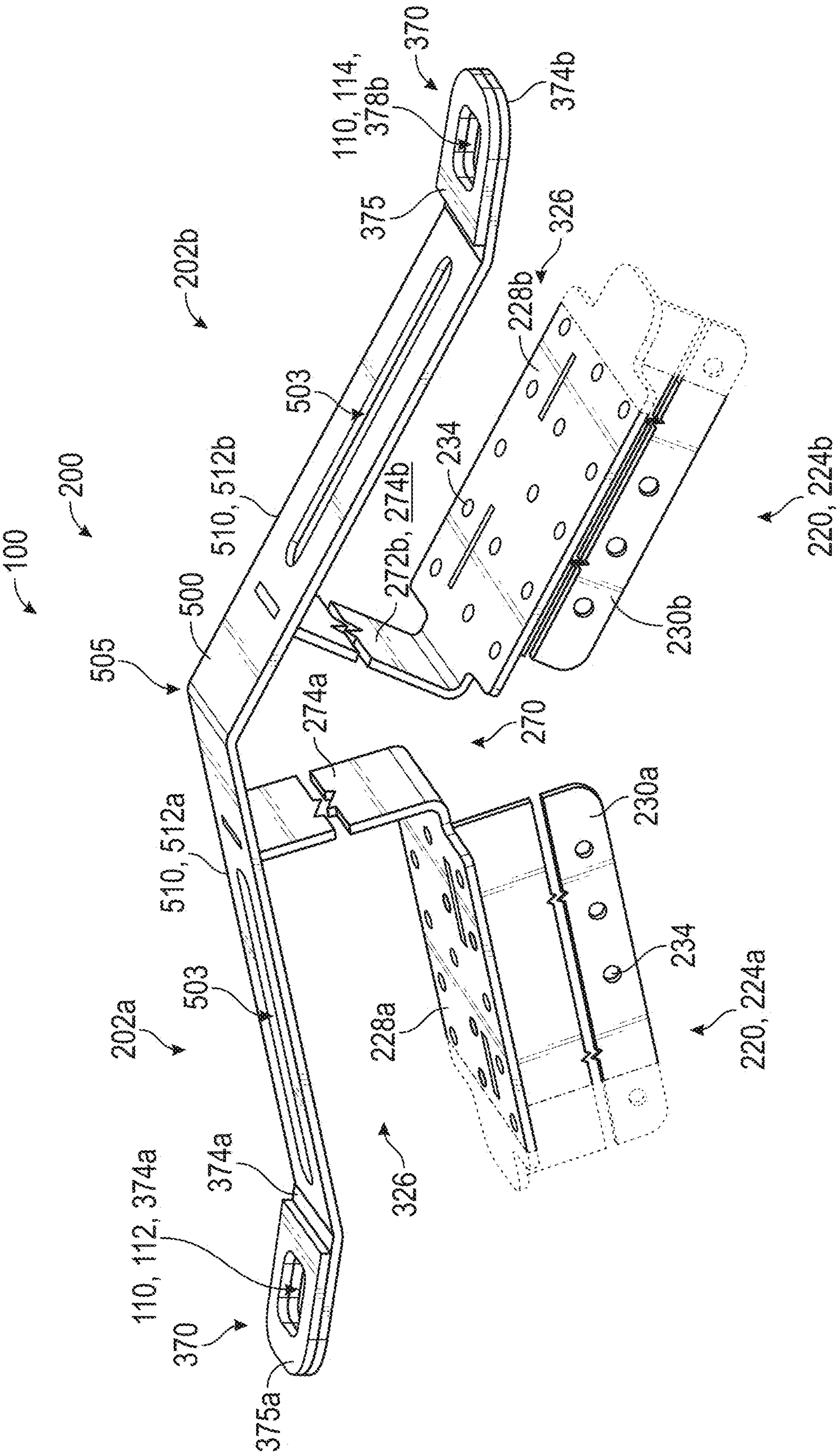
FIG. 1 is a perspective view of a first embodiment of an adjustable, modular support bracket assembly of a roof attachment system, the support bracket providing a secure anchor point on a roof and that includes: (i) an anchor element, and (ii) a truss attachment assembly having a first truss attachment portion and a second truss attachment portion.
Figure 2:
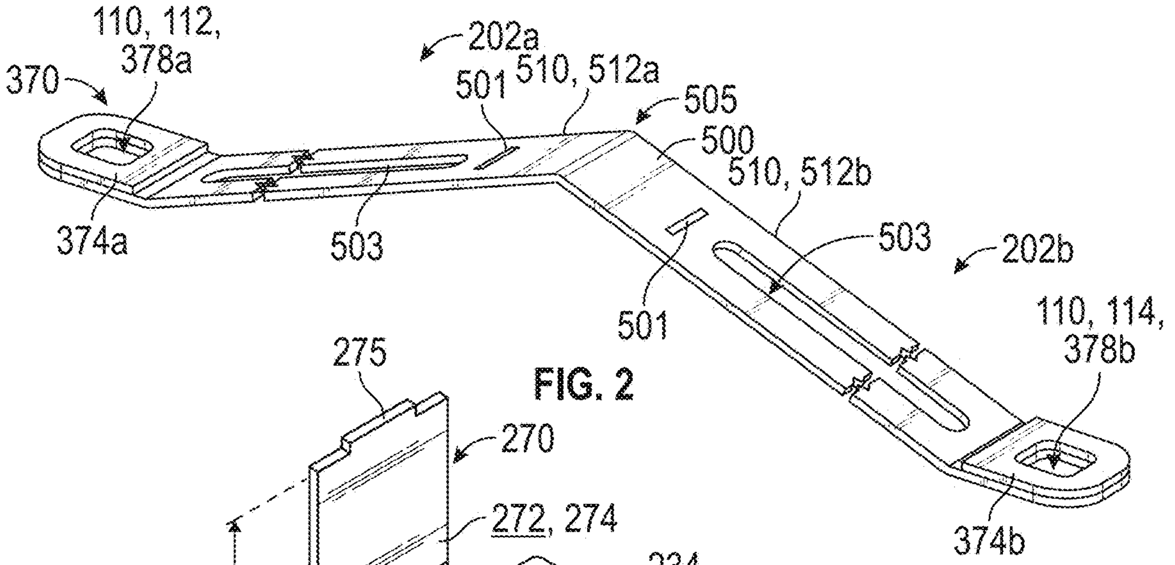
FIG. 2 is a perspective view of the anchor element of the support bracket of FIG. 1.
Figure 19:
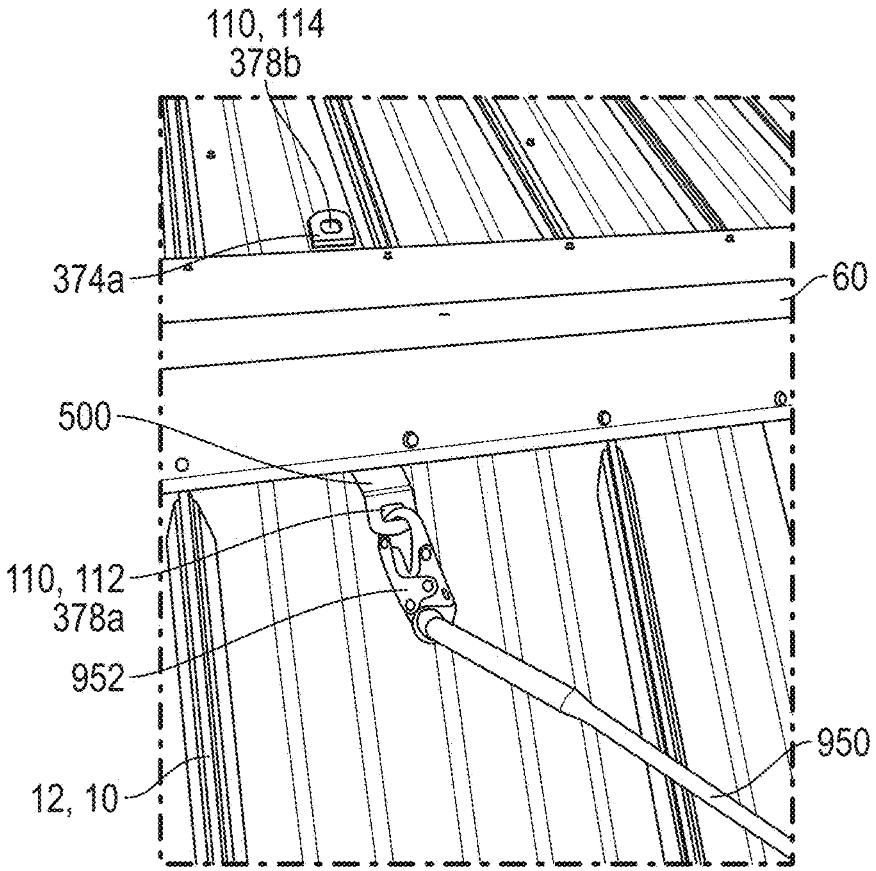
FIG. 19 is a perspective view of another stage in the process of installing the roof on the building structure, wherein opposed couplers of the support bracket extend outward of the ridge cap and are thereby exposed, and a technician is coupled, via a safety line, to one of the couplers of the support bracket to provide a first anchor point.
Figure 20:
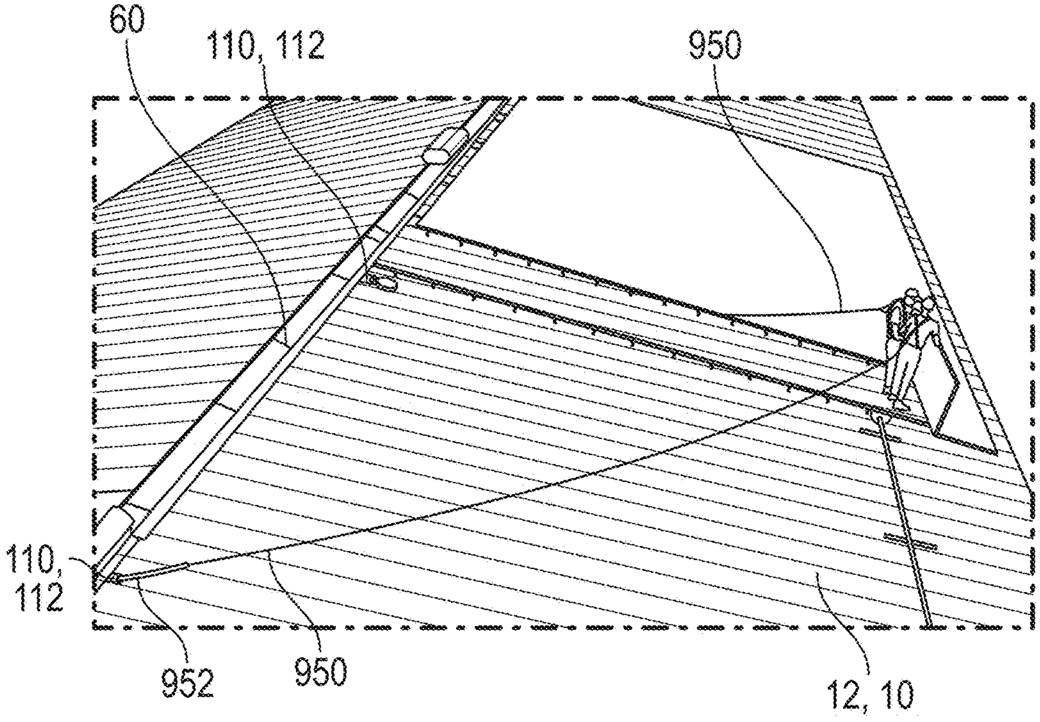
FIG. 20 is a perspective view of another stage in the process of installing solar panels on the roof on the building structure, wherein: (i) a first technician is coupled, via a first safety line, to a coupler of a first support bracket to provide a first anchor point, and (ii) a second installer is coupled, via a second safety line, to a coupler of a second support bracket to provide a second anchor point.
Figure 21:
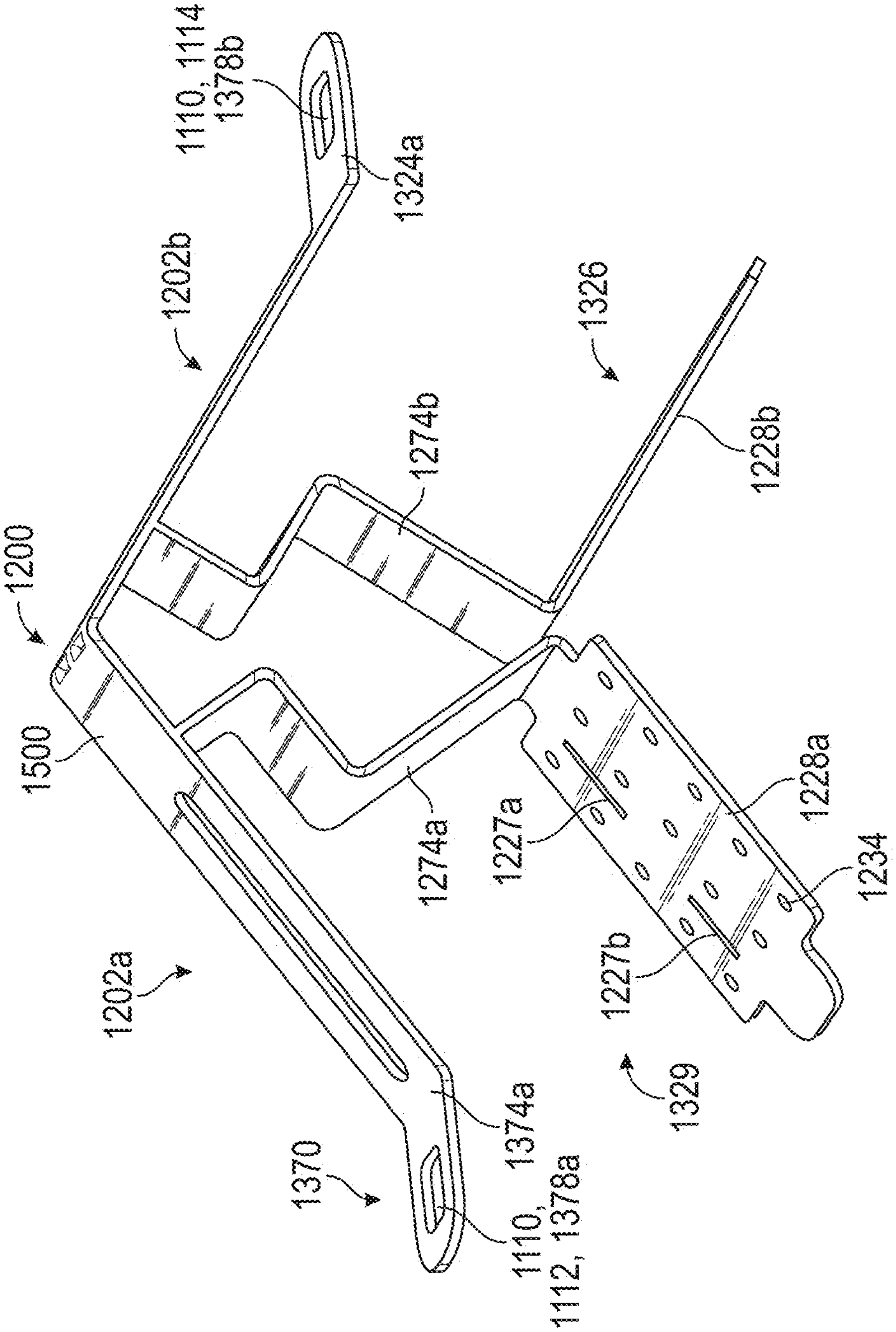
FIG. 21 is a perspective view of a second embodiment of a support bracket assembly of the roof attachment system that includes: (i) an anchor element with opposed couplers, and (ii) truss attachment assembly.
Figure 52:
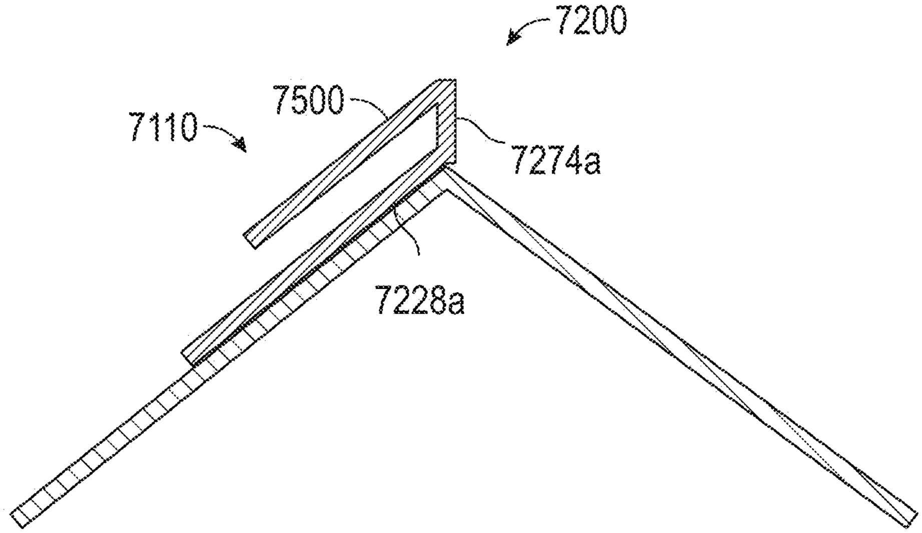
FIG. 52 is a schematic view of an eighth embodiment of a support bracket assembly that includes: (i) an anchor element with a single arm, and (ii) a single truss attachment assembly.

The roof attachment system 100, as illustrated in FIGS. 1-52, encompasses various components, including the support bracket assembly 200, and demonstrates different aspects, views, and applications during the installation, maintenance, or repair of a roof 12 on a commercial or residential building structure 10. The roof attachment system 100 features an adjustable, modular support bracket assembly 200 that enables installers to use at least one support bracket to securely install the roof 12. Upon completion of the installation process, the roof 12 includes the support bracket assembly 200, which provides a series of anchor points along the ridge of the roof. These anchor points facilitate safe maintenance and repair by allowing technicians to securely attach a safety line 950 to the support bracket assembly 200, reducing the risk of falls during work on the roof 12 (FIGS. 19-20).

The Figures disclose eight different embodiments of the support bracket assembly 200. The support bracket assembly 200 can be provided as a modular assembly where a universal anchor element 500 can be coupled to truss attachment assemblies 220 selected for the specified type of roof installation. These and other components of the system 100 function together to provide an anchor point that an installer or a technician can couple his/her safety line 950 to during the installation, maintenance, or repair of the roof 12 and/or the structure 10. This is beneficial for at least the following reasons. First, the support bracket assembly 200 is permanently attached to an extent of the building structure 10, namely the roof 12, which enables the installer or service technician to removably couple a safety line 950 to the support bracket 200 throughout the life of the structure 10. Second, a majority of the support bracket assembly 200 is concealed underneath an extent of the roof 12, which provides a number of benefits to the roof system 100.

Third, the support bracket assembly 200 can be coupled to an extent of the roof 12 (e.g., an extent of a truss 20) prior to when that extent of the roof 12 is elevated above the ground and attached to the support frame, such as walls 14, of the structure 10, which: (i) eliminates the need to attach the support bracket assembly 200 at a later time and (ii) minimizes the risks that the first person up on the roof 12 is exposed to when installing, maintaining, or working on the roof 12. Fourth, the support bracket assembly 200 provides an elevated anchor point for the roof attachment system 100, which: (i) helps ensure that the installer or technician will not make contact with the ground during a fall and (ii) allows the installer or technician to utilize a sufficiently long safety line 950, which reduces the number of times the installer or technician must detach and attach their safety line 950 while on the roof 12, which reduces down-time and increases the working efficiency of the installer/technician.

Fifth, the roof attachment system 100 includes a dual truss attachment configuration that secures the support bracket to both the top and sides of the truss, preventing twisting or shifting under load. This stability helps couple the support bracket to the truss and helps prevent the anchor element from disengaging from the truss when subjected to dynamic forces, such as those experienced during a fall. The robust coupling between the roof and said root attachment system 100 meets regulation, requirements, or guidelines set forth by governing or regulating body. For example, the roof attachment system 100 meets Occupational Safety and Health Administration's ("OSHA") requirements identified below and incorporated herein by reference.

Sixth, the disclosed support bracket assembly 200-7200 feature a modular design consisting of a universal anchor element 500 and interchangeable truss attachment assemblies 220, 1220, 2220, 3220 that can be selected based on specific roof installation requirements such as pitch, purlin type, or retrofit needs. The anchor element is compatible with multiple truss attachment assemblies and can be manually adjusted or bent to match the roof pitch 12, providing additional adaptability during installation. This modularity extends to the truss attachment portions themselves; the first and second truss attachment portions can be configured differently based on the truss design, with purlin support structures within the first truss attachment portion varying in height to accommodate different purlin sizes. This flexibility allows installers to mix and match components to meet specific building needs without altering the core anchor element, ensuring compatibility across diverse roof designs while reducing waste and improving overall installation efficiency. By significantly reducing the number of distinct parts that need to be manufactured and stocked—potentially lowering manufacturing and inventory costs by ninefold or more—the modular approach offers substantial resource-related and cost benefits recognized by those skilled in the art. Manufacturers are not required to fabricate numerous specific internal support brackets for each roof pitch, and installers do not need to stock a wide variety of parts, thereby minimizing costs and logistical complexity. While utilizing non-adjustable support brackets is feasible, it necessitates the fabrication and stocking of many specific parts for each roof pitch, increasing material, manufacturing, and inventory costs; therefore, the modular and adjustable features of the disclosed support bracket assembly provide significant advantages over non-adjustable counterparts.

In general terms, the support bracket 200 creates an elevated attachment point 110 that an installer or repair technician can removably couple his/her safety line 950 to during the installation, maintenance, or repair of the roof 12 and/or the structure 10. The elevated attachment point 110 provides two anchor points 112, 114, each of which may be available during the first portion or stage of the roof 12 installation by the support bracket assembly or support bracket 200. In particular, the first and second anchor points 112, 114, of the support bracket 200 are spaced apart and positioned on either side of the ridgeline, R of the roof 12. Additionally, in most scenarios, multiple support brackets 200 are installed within the structure 10, which provide multiple elevated attachment points 110 that are spaced longitudinally apart (e.g., typically at least 8 feet and more typically about 16 feet) along the ridgeline, R or length of the roof 12. This configuration of multiple attachment points 110 along the roof 12 helps ensure that the installer or repair technician can removably couple his/her safety line 950 for full working coverage of the area of the roof 12 during the installation, maintenance, or repair of the roof 12 and/or the structure 10. In summary, if the structure 10 includes multiple internal support brackets 200, then the structure 10 will include multiple elevated attachment points 110 that are positioned: (i) on either side of the ridgeline (e.g., first and second anchor points 112, 114 are on opposite sides of the ridgeline and (ii) along the length of the building 10.

All of the disclosed versions of the support bracket 200-7200 are designed to be used in a similar manner and as such, they have many overlapping components and functional aspects. Accordingly, the following description primarily focuses on the first embodiment of the support bracket 200 with the understanding that this disclosure will apply to the other embodiments of the internal support brackets 1200-7200. As such, similar structures and components amongst these embodiments are identified by similar numbers that are separated by 1000s. For example, the disclosure in connection with the first purlin support structure 274*a* of the support bracket 200 applies to the first purlin support structure 1274*a* of the support bracket 1200. Thus, multiple reference numbers for the second through the eighth internal support brackets 1200-7200 are not included within this specification and instead, one shall refer to the disclosure of similar structures for the first embodiment of the support bracket 200. This format of the disclosure is done for efficiency and should not be construed to limit the disclosure in any manner. In fact, it should be understood that any structure or feature that is shown within or pertaining to anyone of the disclosed embodiments can be added to, used in connection with, or used instead of a structure or feature of another one of the disclosed embodiments.

2. Support Bracket Assembly

As shown in FIG. 1, the support bracket assembly or support bracket 200 is an adjustable, modular support bracket assembly that provides a secure anchor point on a roof and that includes: (i) an anchor element 500, and (ii) a pair of truss attachment assemblies 220. The anchor element 500 includes a connecting member 510 that extends between the first and second coupling members 374*a*, 374*b* and forms an apex 505 of the support bracket assembly 200. In other words, the connecting member 510 can have opposed first and second arms 512*a*, 512*b* that mirror each other and extend outward from the apex 505 to first and second coupling members 374*a*, 374*b* at respective ends of each arm 512*a*, 512*b*. For example, the arms 512*a*, 512*b* of the connecting member 510 form an interior angle alpha-1 ($\alpha_1$) at the apex 505. The anchor element 500 can be made from a material that bendable such that the interior angle alpha-1 ($\alpha_1$) at the apex 505 of the connecting member 510 can be changed by the installer to adjust the support bracket to match the pitch of the roof, if needed, at the time of installation. The truss attachment assembly 220 includes a first truss attachment portion 270 and a second truss attachment portion 230. The first truss attachment portion 270 includes a base portion or upper portion 228*a*, 228*b* and a support member or purlin support structure 274 extending therefrom. The upper portion 228*a*, 228*b* is modular and configured to be secured to an extent of a top surface of a truss 20, where the support member 274 extends in a substantially perpendicular direction from the top surface. The second truss attachment portion 230 is configured to be secured to an extend of a side surface of a truss 20 and can be coupled to the first truss attachment portion 270 prior to installation to form the truss attachment assembly 220. A pair of truss attachment assemblies 220 are coupled to the anchor element 500 to form the support bracket 200.

The support bracket 200 can be provided as a kit including an anchor element 500, first truss attachment portion 270, and a second truss attachment portion 230 can be selected based on the size and configuration required for the installation. Various embodiments of the truss attachment assembly 220, 1220, 2220, 3220 are disclosed herein and can be selected for use with various embodiments of anchor element 500, 1500, 2500, 3500 to the extent applicable and based on the installation and roof design. The various options for truss attachment assembly 220 including a first truss attachment portion 270 and/or a second truss attachment portion 230 are discussed herein. For example, as shown in the FIGS. 3 and 4, various embodiments of the first truss attachment portion 270 are shown based in part on the size or height ($H_P$) of the purlin 22. For example, the first truss attachment portion 270 of the truss attachment assembly 220 can be designed for use with 1.5 inch purlin (FIG. 3) or 3 inch purlin (FIG. 4), among other sizing options, where only the height ($H_{PA}$) of the purlin support structure

274*a*, 274*b* or mounting surface 272*a*, 272*b* is changed. In some embodiments, the first truss attachment portion 270 can also include can include other modifications that will be described in further detail. It should be understood that in other embodiments, $H_{PA}$ and $H_P$ may be any value, including values between 0.25 inches to 20 inches, preferably 0.5 inches to 5 inches, and most preferably between 1.25 inches and 4 inches.

As shown in Figures, the support bracket assembly 200 is adapted, designed, and configured to be used in connection with a post-frame building. The support bracket 200 includes: (i) a first extent of the support structure 202*a* and (ii) a second extent of the support structure 202*b*. The first and second extent of the support structures 202*a*, 202*b* are mirror images of one another and extend from the apex 505 of the anchor element 500. The anchor element 500 is configured to be bent at the connecting member 510 to match the pitch of the roof, which provides the adjustability aspect of this first embodiment of the support bracket 200, which will be discussed in greater detail below.

a. Anchor Element

The anchor element 500 is coupled to each purlin support structure 274*a*, 274*b*, of the truss attachment assembly 220 and includes: (i) the coupling assembly 370 and openings formed there through to allow for securement of the truss attachment assembly 220 to the truss 20, and (ii) connecting member 510.

i. First and Second Coupling Members

The coupling assembly 370 includes: (i) a first coupler or coupling member 374*a* that forms part of the first extent of the support structure 202*a* and (ii) a second coupler or coupling member 374*b* that forms part of the second extent of the support structure 202*b*. The first and second coupling members 374*a*, 374*b* of the coupling assembly 370 are in an opposed positional relationship to one another about the support bracket center line, IC. The first and second coupling members 374*a*, 374*b* are configured to enable an installer to connect their safety line 950 to the support bracket 200 without the use of a separate securement assembly. As such, the first and second coupling members 374*a*, 374*b* create the first and second anchor points 112, 114, when the support bracket 200 is coupled to an installed truss 20. Optionally, the anchor element 500 can also include end plates 375*a*, 375*b* configured to substantially match and reinforce the first and second coupling members 374*a*, 374*b*. In other embodiments, the end plates 375*a*, 375*b* may be omitted and the first and second couplers or coupling members 374*a*, 374*b* may be strengthened using any one or any combination of the following methods welding, preheating, post-heating, post-weld heat treatment (PWHT), quenching and tempering, thermomechanical processing, hardfacing, work hardening (cold working), solid solution strengthening, precipitation hardening, surface hardening techniques (carburizing, nitriding), shot peening, laser hardening, cryogenic treatment, strain hardening, laminating or cladding, ultrasonic impact treatment, electron beam hardening, surface coatings (PVD, CVD), and/or any other known methods.

Figure 25:
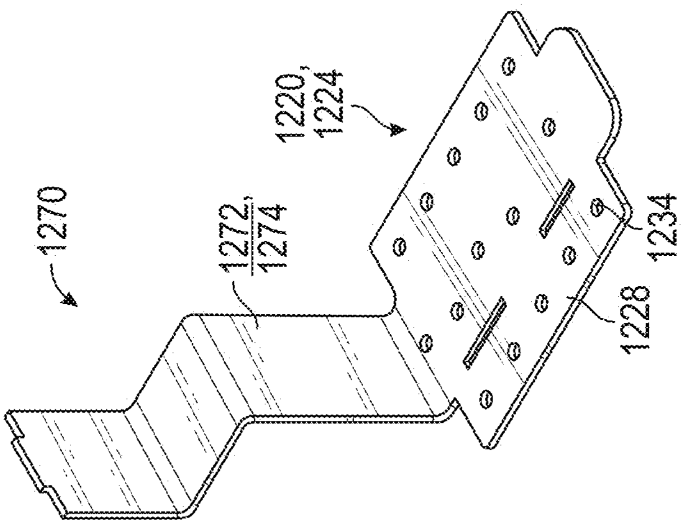
FIG. 25 is a perspective view of a third embodiment of the truss attachment assembly designed for use with 3.5 inch purlin with a 2 inch offset.

To create the first and second anchor points 112, 114, the first coupling member 374*a* includes a first opening 378*a* and the second coupling member 374*b* includes a second opening 378*b*. These openings 378*a*, 378*b* are designed to receive an extent of the safety line 950; specifically, an extent of the carabiner 952 that is coupled to the safety line 950, as shown in FIG. 25. The openings are positioned at a distance from one another and as such the first and second anchor points 112, 114 are positioned at a distance from one another. In alternative embodiments, the openings 378*a*, 378*b* may be replaced by any type of safety line coupling means, which includes a clip that is specifically designed to receive an extent of a structure that is coupled to the safety line 950, a structure that is designed to clamp onto the safety line 950 without a separate structure, a combination of these structures, or other releasable mechanical couplers that may be used with safety lines 950.

ii. Connecting Member

Figure 15:
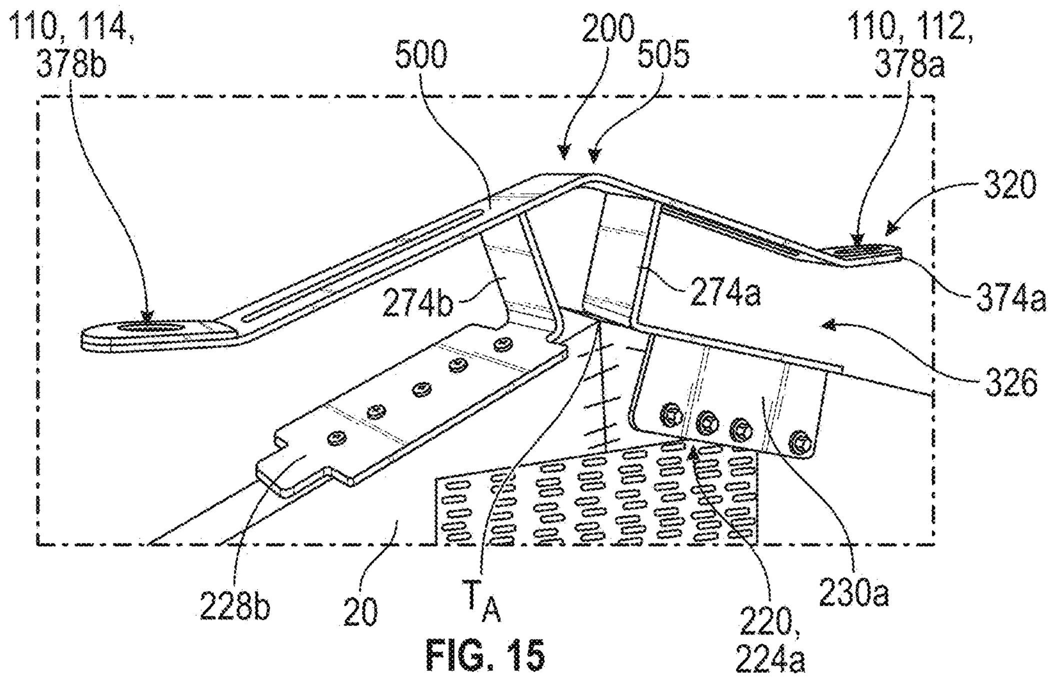
FIG. 15 is a perspective view of a stage in the process of installing a roof on a building structure, wherein the support bracket assembly of FIG. 1 is connected to a truss.
Figure 16:
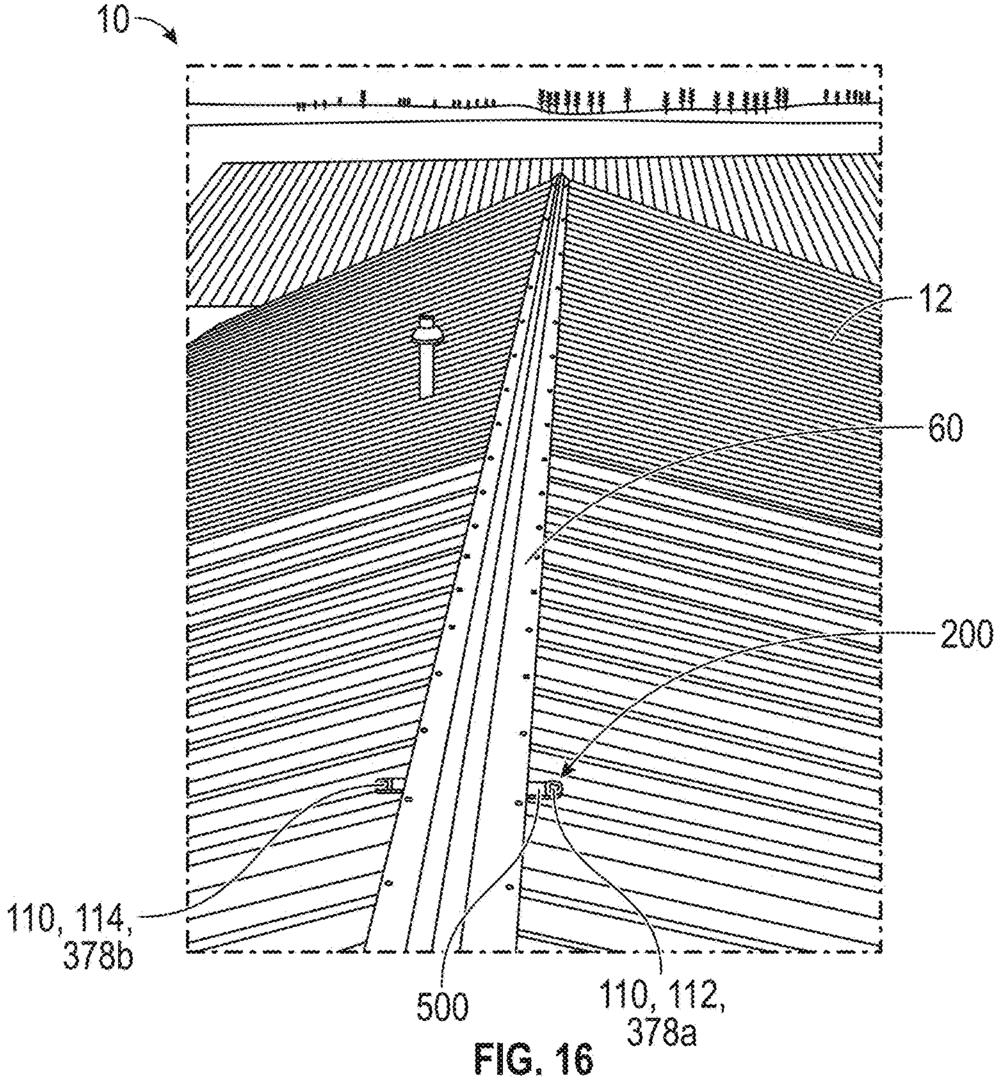
FIG. 16 is a first perspective view of another stage in the process of installing the roof on the building structure, wherein a ridge cap is installed over an extent of the support bracket assembly of FIG. 1.
Figure 17:
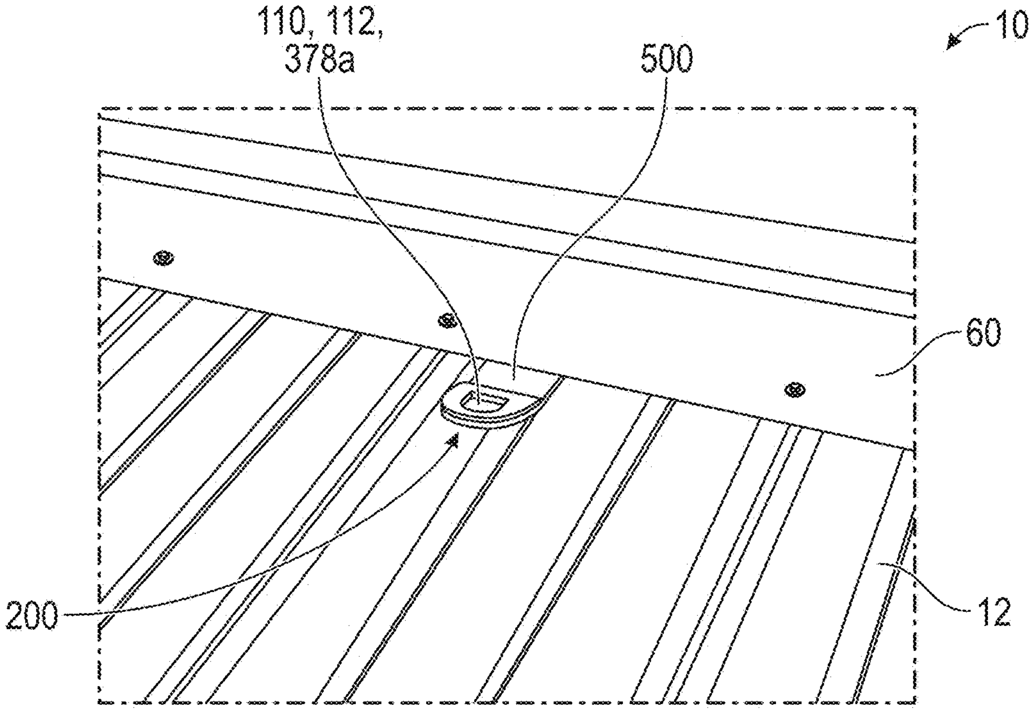
FIG. 17 is a second perspective view of FIG. 16, wherein a coupler of the support bracket extends outward of the ridge cap and is thereby exposed.
Figure 18:
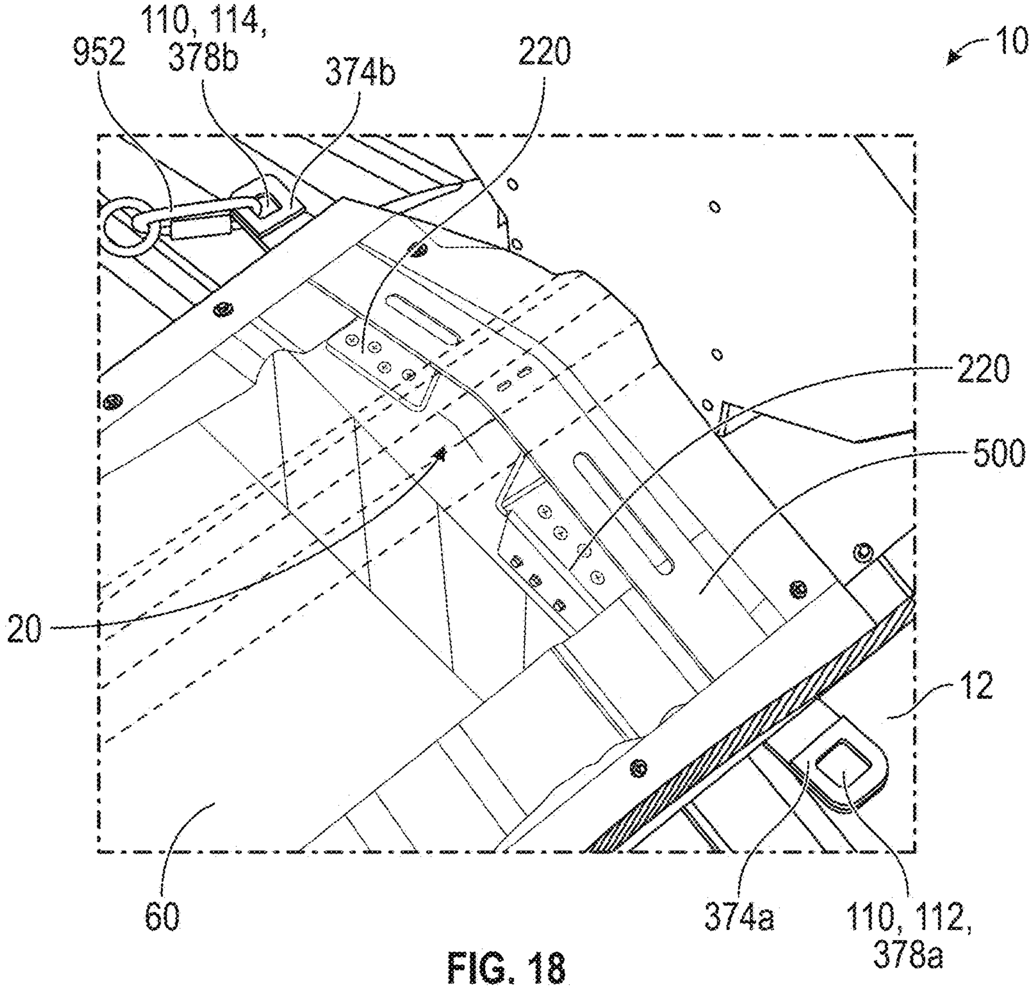
FIG. 18 is a perspective view of the roof on the building structure, wherein a ridge cap (represented as substantially transparent) is installed over an extent of the support bracket assembly of FIG. 1 to show the coupling of the support bracket assembly to the truss of the roof and reception of an extent of a roof panel in the receptacle of the support bracket.
Figure 48:
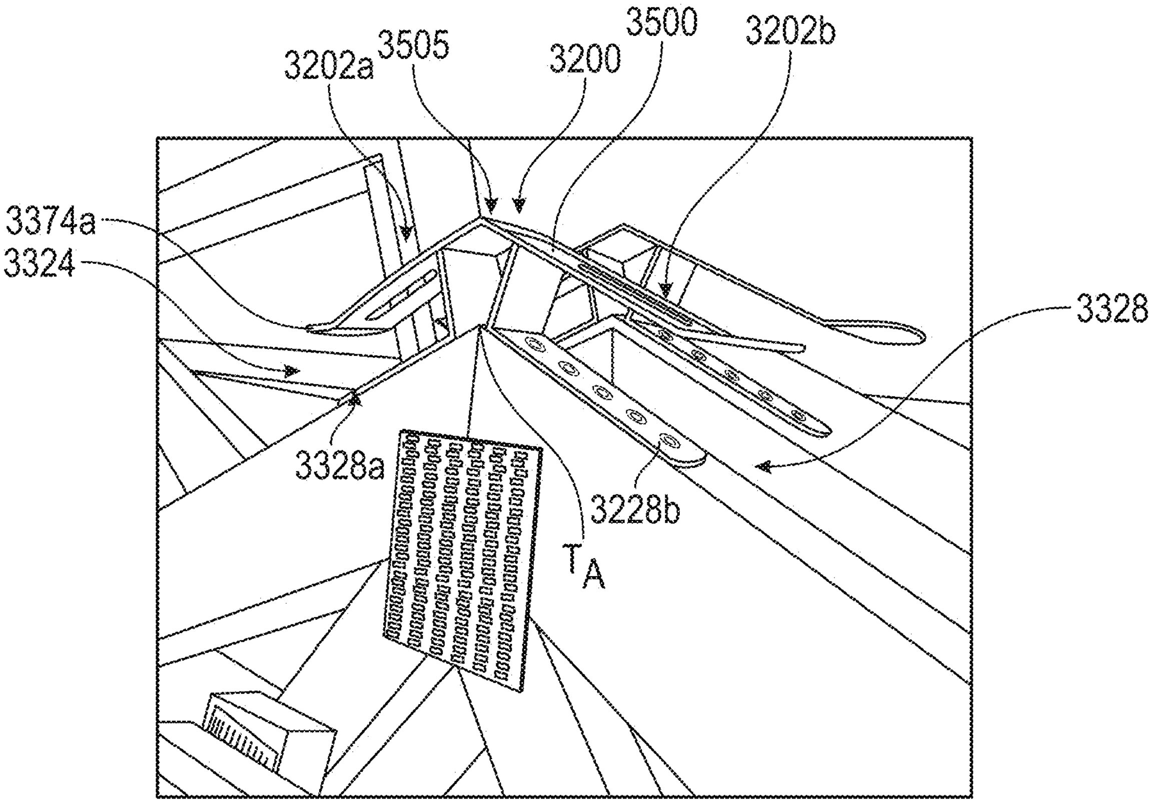
FIG. 48 is a perspective view of a stage in the process of installing a roof on a building structure, wherein the support bracket anchor element of FIG. 34 is affixed to a truss, but neither shingles nor roof sheathing is not yet installed within the channels of the support bracket.
Figure 49:
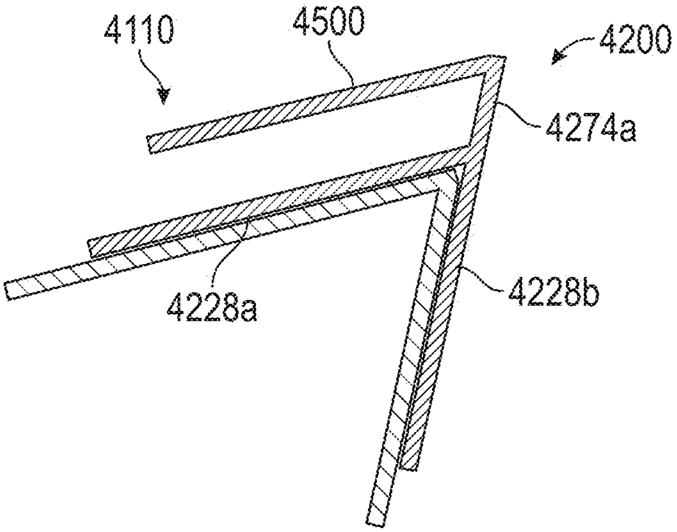
FIG. 49 is a schematic view of a fifth embodiment of a support bracket assembly that includes: (i) an anchor element with a single arm, and (ii) a truss attachment assembly with a pair of truss attachment portions.
Figure 50:
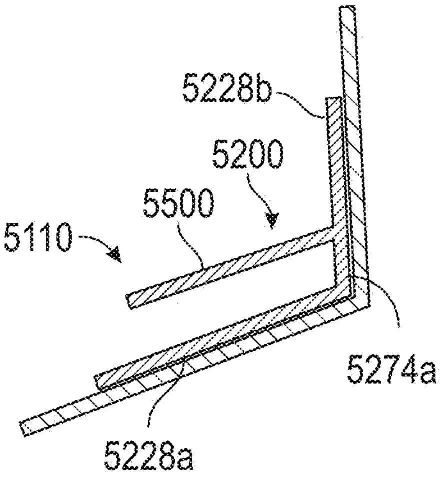
FIG. 50 is a schematic view of a sixth embodiment of a support bracket assembly that includes: (i) an anchor element with a single arm, and (ii) a truss attachment assembly with a pair of first truss attachment portions.

The connecting member 510 extends between the first and second coupling members 374*a*, 374*b* and forms the apex 505 of the support bracket assembly 200. As shown in FIGS. 15 and 48, the apex 505 of the connecting member 510 of the support bracket 200 is configured in certain installations to be aligned with the apex of the truss TA. Because the center line, IC of the support bracket 200 can be aligned with the apex of the truss TA in certain installations.

The bottom surface of the first and second coupling members 374*a*, 374*b* are angled relative to the bottom surface of the connecting member 510. The angle alpha-2 ($\alpha_2$) formed between the bottom surface of the first and second coupling members 374*a*, 374*b* and the bottom surface of the connecting member 510 is between 1 degree and 60 degrees, and preferably between 10 degrees and 40 degrees. Said angle alpha-2 ($\alpha_2$) helps ensure that the installer can clip their carabiner 952 to the anchor points 112, 114. Without said angle alpha-2 (@2), the first and second coupling members 374*a*, 374*b* would be positioned at the same angle as the roof and the space provided between the first and second coupling members 374*a*, 374*b* and the roof would hamper the usability of connecting and disconnecting from the support bracket 200. Also, connecting member 510 is designed such that the first and second coupling members 374*a*, 374*b* are designed to be positioned outside or beyond the ridge cap 60 to ensure that the installer can clip their carabiner 952 to the anchor points 112, 114. In contrast, if the first and second coupling members 374*a*, 374*b* were not positioned outside or beyond the ridge cap 60, the system 100 would not work because the installer could not be able to clip their carabiner 952 to the anchor points 112, 114. In other words, the support bracket 200 could not function if it was hidden, internal to, or concealed within the ridge cap 60.

b. Truss Attachment Assembly

The truss attachment assembly 220 is configured to attach to an extent of a truss 20 and can be coupled to the truss 20: (i) prior to the installation of the truss 20 on the walls 14 of the structure 10 or (ii) after installation of the truss 20 on the walls 14 of the structure 10. Coupling the support bracket 200 to truss 20 prior to the installation of the truss 20, allows for the installer or builder to couple a safety line 950 to the highest point of the truss 20 before the truss 20 is installed on the structure 10. Once the truss 20 has been properly secured to the walls 14 of the structure 10 and the safety line 950 is coupled to the support bracket 200, an elevated attachment point 110 has been created that specifically includes two individual anchor points 112, 114. In particular, this elevated attachment point 110, including the two anchor points 112, 114, is in a raised vertical position relative to: (i) the ground, (ii) foundation of the structure 10, (iii) the upper extent of the walls 14, (iv) the apex 20*a* of the truss 20 and (v) typically a majority of the roof 12. The combination of the safety line 950 and this elevated attachment point 110 helps reduce the risks that are experienced by the first person up on the roof 12, which includes the risk of falling off the roof 12 and hitting the ground. Additionally, this elevated attachment point 110 is beneficial over an anchor point that is at the height of the upper extent of the wall 14 because this allows the installer to properly use a longer safety line 950. This longer safety line 950: (i) permits the installer to have a wider range of movement to continue installing, repairing, or maintaining the roof 12 and (ii) reduces the number of time the installer must disconnect and reconnect his safety line 950 to new anchor points. Although coupling the support bracket 200 to the truss 20 prior to its installation is not required for the use of the support bracket 200, there are significant advantages (e.g., as discussed above) of coupling the support bracket 200 prior to the installation of the truss 20.

Figure 11:
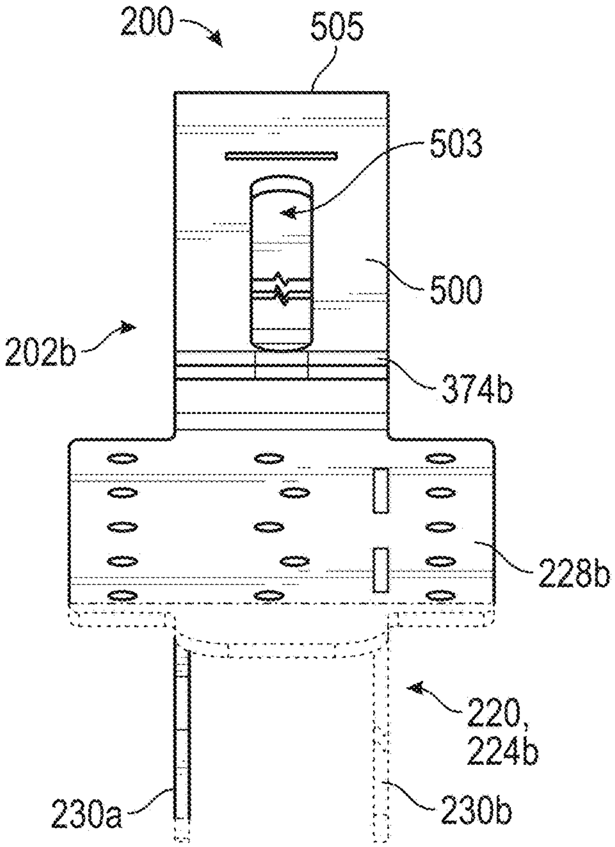
FIG. 11 is a first end view of the support bracket assembly of FIG. 1.
Figure 12:
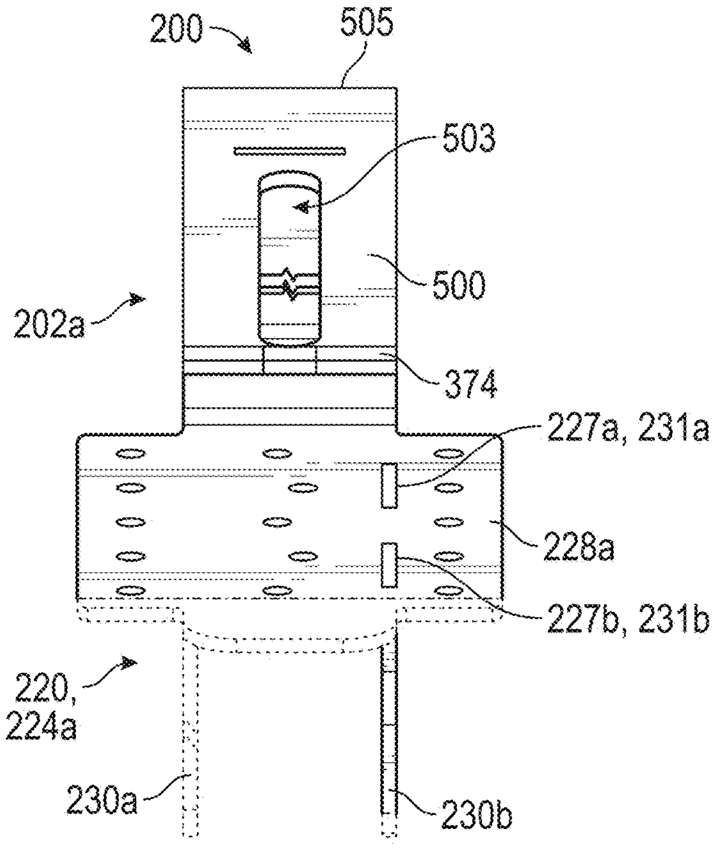
FIG. 12 is a second end view of the support bracket assembly of FIG. 1.

The truss attachment assembly 220 includes: (i) a first truss attachment segment 224*a* that forms part of the first extent of the support structure 202*a* and (ii) a second truss attachment segment 224*b* that forms part of the second extent of the support structure 202*b*. As such, the first and second truss attachment segments 224*a*, 224*b* are in an opposed relationship to one another about a support bracket center line, IC. Each truss attachment segment 224*a*, 224*b* is comprised of an arrangement of a first or upper portion 228*a*, 228*b*, and a second, lower, or vertical portion 230*a*, 230*b* coupled thereto. As shown in FIGS. 11 and 12, the vertical portion 230*a* that is part of the first extent of the support structure 202*a* is configured to be positioned on a first side of the truss 20, while the vertical portion 230*b* that is part of the second extent of the support structure 202*b* is configured to be positioned on an opposed/second side of the truss 20. This configuration helps secure the support bracket 200 to the truss 20 and helps prevent twisting of the support bracket 200, which said support bracket 200 is subjected to a significant load.

Figure 8:
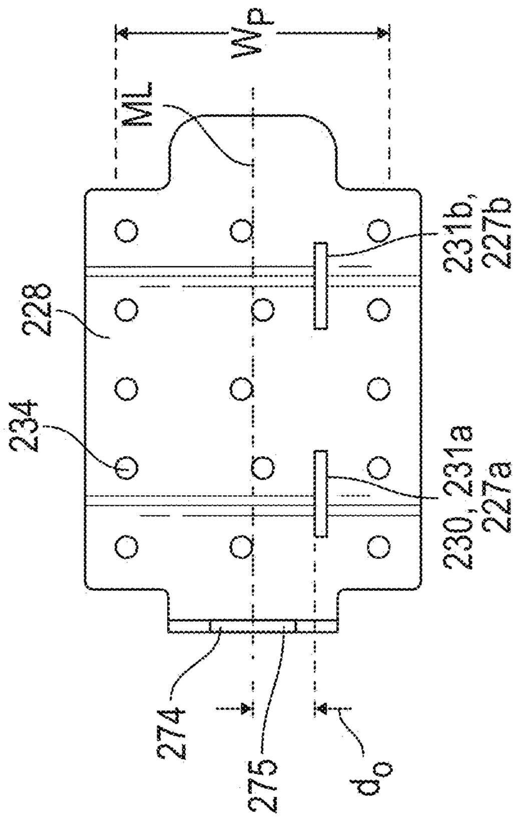
FIG. 8 is a top view of the truss attachment assembly of FIG. 7.

Each portion 228*a*, 228*b*, 230*a*, 230*b* has a plate like configuration and at least one aperture 234 formed through said portions 228*a*, 228*b*, 230*a*, 230*b*, wherein each aperture 234 is designed to receive an extent of an elongated coupler 236 to aid in the coupling of the support bracket 200 to the truss 20. The number of apertures 234 that are formed within each of the portions 228*a*, 228*b* may be between 0 and 42, preferably between 3 and 30, more preferably between 9 and 21, and most preferably between 15 and 18. The number of apertures 234 that are formed within each of the portions 230*a*, 230*b* may be between 0 and 30, preferably between 0 and 10, more preferably between 1-5, and most preferably 4. There are multiple configurations for the location of these apertures 234, some non-limiting examples are disclosed below. As shown in FIG. 8, the apertures 234 within the first segment 228*a*, 228*b* may be offset with one another, which may reduce detachment failures because a larger extent of the truss must fracture before detachment occurs. Additionally, each aperture 234 contained within the first portion 228*a*, 228*b* may not be positioned within a plane that contains an aperture 234 formed within the second portion 230*a*, 230*b*.

While the above describes a first possible location of the apertures 234 within the portions 228*a*, 228*b*, 230*a*, 230*b*, it should be understood that other possible locations for these apertures 234 are possible. In a first embodiment, the apertures 234 that are formed within the first and third segments: (i) could be moved to the center or closer to the second linear portion 230*a*, 230*b* or (ii) staggered from one another (e.g., not aligned). In a second embodiment, the apertures 234 formed in the second portion 230*a*, 230*b* may be aligned with one another (e.g., not staggered) or may be placed outside of the center of the width of the second portion 230*a*, 230*b*. In a third embodiment, none of the apertures 234 contained within the truss attachment assembly 220 may be aligned with one another. Finally, in a fourth embodiment, all of the apertures 234 contained within the truss attachment assembly 220 may be aligned with one another. In alternative embodiments, the combination of the aperture(s) 234 and elongated coupler(s) 236 may be replaced by any type of truss coupling means, which includes welding (e.g., spot or butt welds), projections that extend from the inner surfaces of the portions 228*a*, 228*b*, 230*a*, 230*b* and are received by the truss 20, ball-detent, rivets, or other mechanical or chemical couplers.

Figure 5:
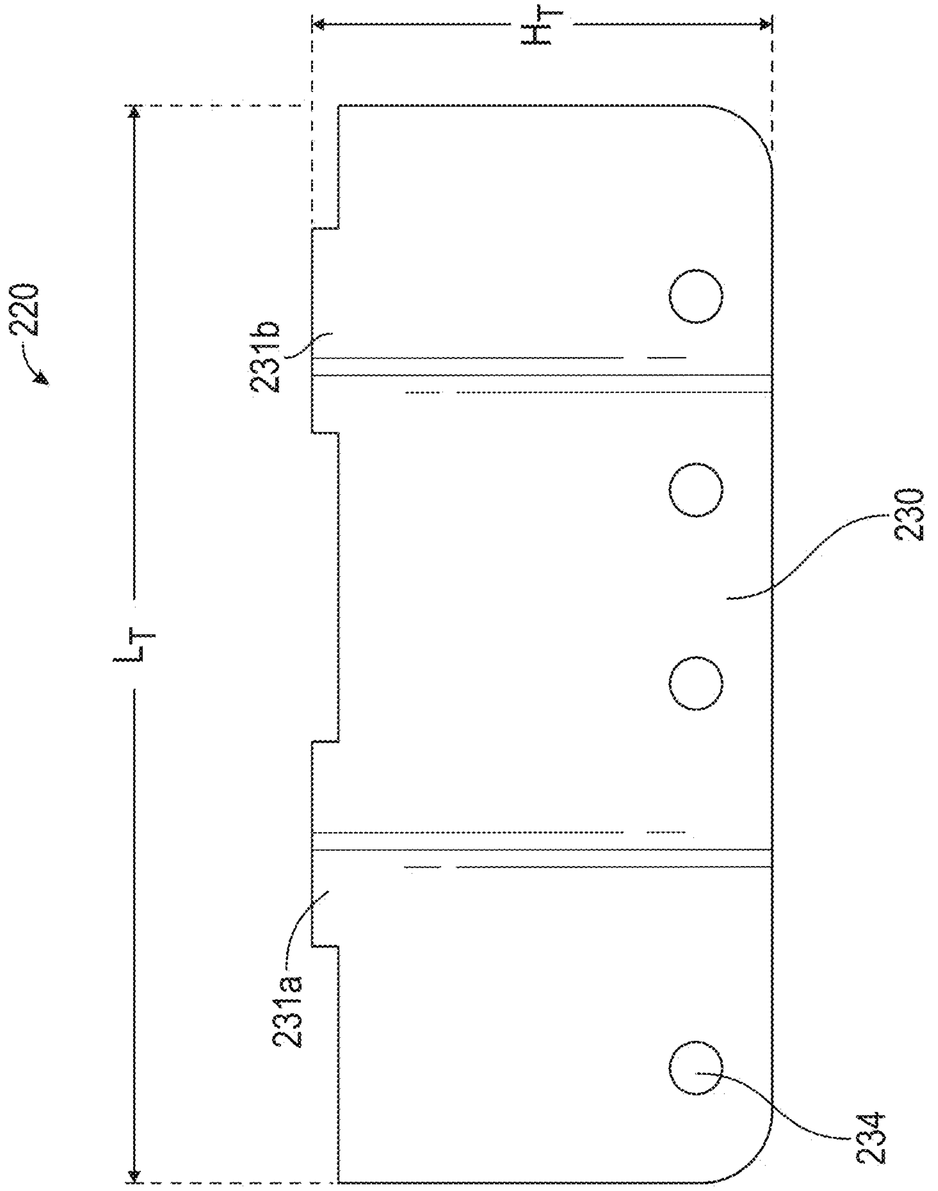
FIG. 5 is a side view of the second truss attachment portion of the truss attachment assembly of the support bracket.
Figure 9:
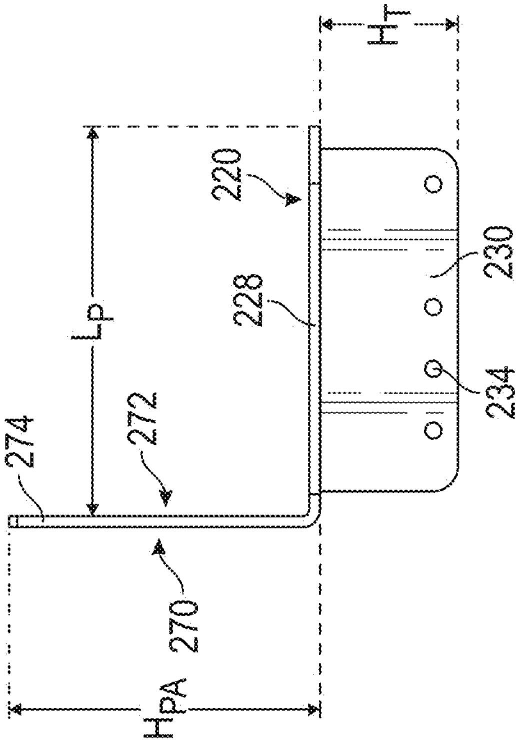
FIG. 9 is a side view of the truss attachment assembly of FIG. 7.
Figure 7:
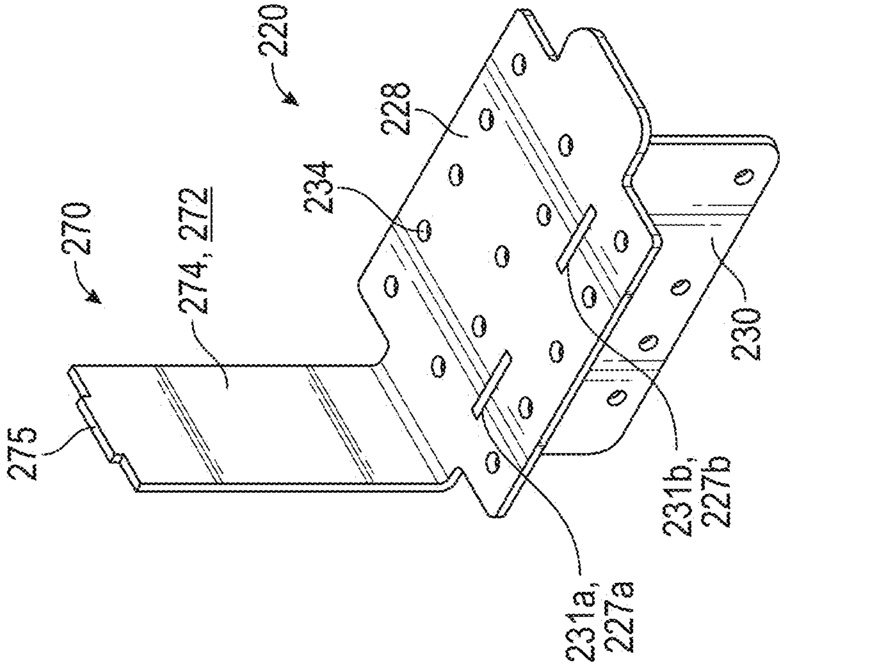
FIG. 7 is a perspective view of the truss attachment assembly of the support bracket of FIG. 1.

Further, as shown in FIG. 8, the first portions 228*a*, 228*b* can have a $W_P$ that is greater than the width of the truss 22. The apertures 227*a*, 227*b* formed in the first portions 228*a*, 228*b* can be offset from a midline (ML) of the first truss attachment portion 270. The offset distance ($d_o$) can be about half the thickness of a truss 20 to which the support bracket 200 will be attached. As such, when projections 231*a*, 231*b* are received into the apertures 227*a*, 227*b* to form the truss attachment assembly 220, the second or vertical portions 230*a*, 230*b* extending therefrom will be off-center. As shown in FIGS. 11 and 12, when a pair of said truss attachment assemblies 220 are assembled with the anchor element 500, one vertical portion 230*a* will abut one side surface of the truss 20 and the other vertical portion 230*b* will abut the opposite side surface of the truss 20 providing additional stability to the support bracket 200 when installed and helps prevent twisting of the support bracket 200. As shown in FIGS. 5 and 9, the second portions 230*a*, 230*b* can have a length $L_T$ that is less than the length $L_P$ of the first portions 228*a*, 228*b*. In some embodiments, the height $H_T$ of the portions 230*a*, 230*b* is less than the purlin support structure height, $H_{PA}$. In some embodiments, the height $H_T$ of the portions 230*a*, 230*b* is equal or greater than the purlin support structure height, $H_{PA}$, depending on the configuration.

i. First Truss Attachment Portion

Figure 3:
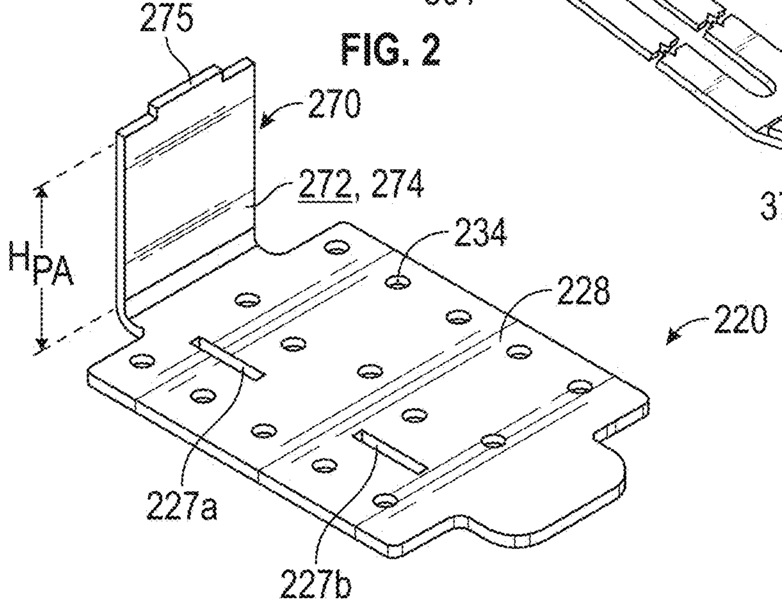
FIG. 3 is a perspective view of a first embodiment of the first truss attachment portion of the truss attachment assembly of the support bracket that is designed for use with 1.5 inch purlin.
Figure 4:
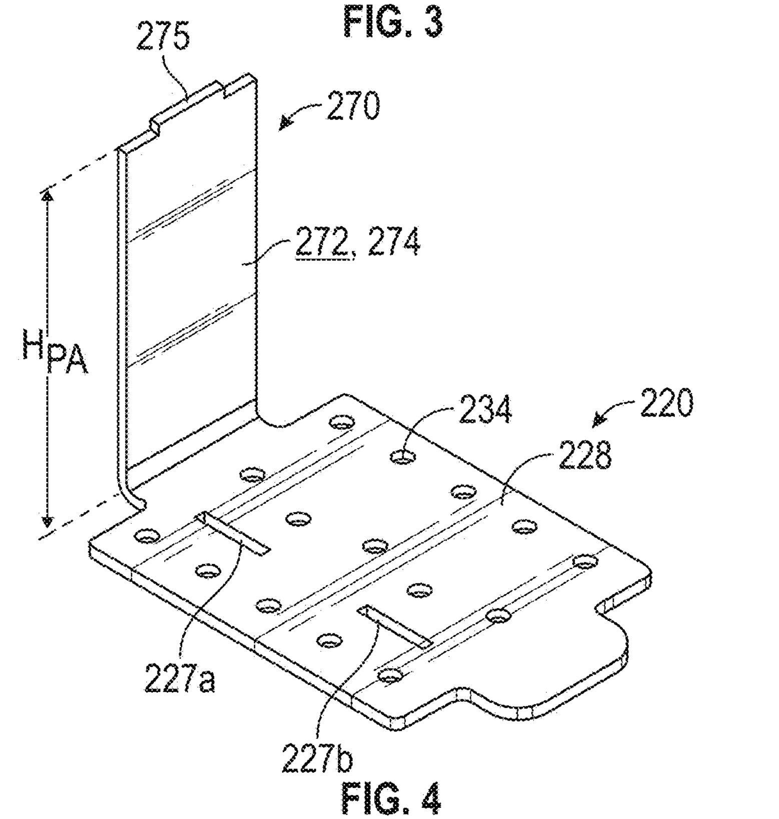
FIG. 4 is a perspective view of a second embodiment of the first truss attachment portion of the truss attachment assembly of the support bracket that is designed for use with 3 inch purlin.
Figure 10:
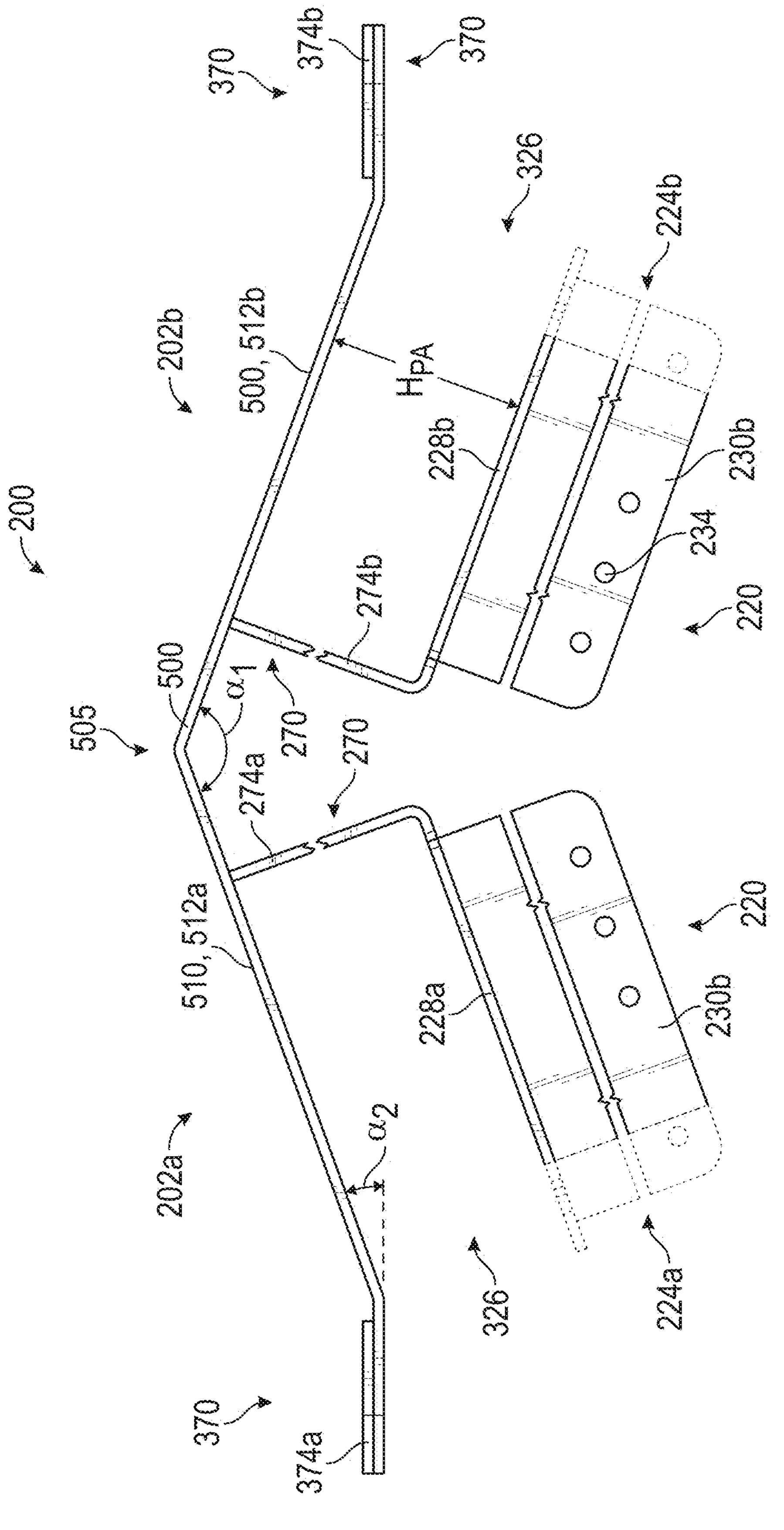
FIG. 10 is a side view of the support bracket assembly of FIG. 1.

The first truss attachment portion 270 includes: (i) a first purlin support structure 274*a* that forms part of the first extent of the support structure 202*a* and (ii) a second purlin support structure 274*b* that forms part of the second extent of the support structure 202*b*. As such, the first and second purlin support structures 274*a*, 274*b* are in an opposed relationship to one another about the support bracket center line, IC. In particular, the purlin 22 runs across an extent of the length of the building and links the trusses to one another. As best shown in FIGS. 3, 4, and 10, the purlin support structure height, $H_{PA}$, of the purlin support structure 274*a*, 274*b* or the height of the mounting surface 272*a*, 272*b* is approximately equal to the height, $H_P$, of the purlin 22. The mounting surfaces 272*a*, 272*b* of the purlin support structures 274*a*, 274*b* are positioned substantially perpendicular to the second segment 230*a*, 230*b* of the truss attachment segment 224*a*, 224*b*. This configuration positions an extent of the purlin 22 substantially perpendicular to the top surface 20*b* of the truss 20, when the purlin 22 is coupled to the purlin support structure 274*a*, 274*b*.

The first truss attachment portion 270 coupled to first and second arms 512*a*, 512*b* of the anchor element 500 form channels 326*a*, 326*b* on opposing sides. For example, the securement channel 326*a* defined by an extent of arm 512*a*, purlin support structure 274*a*, and first or upper portion 228*a* of truss attachment segment 224*a*. The channels 326*a*, 326*b* are configured to receive an extent of the roof panel 24. For example, the securement channel receives an extent of the adjacent shingle(s)/panel(s) and an extent of (i) an adjacent purlin, or (ii) roof sheathing, depending upon the roof configuration.

Figure 13:
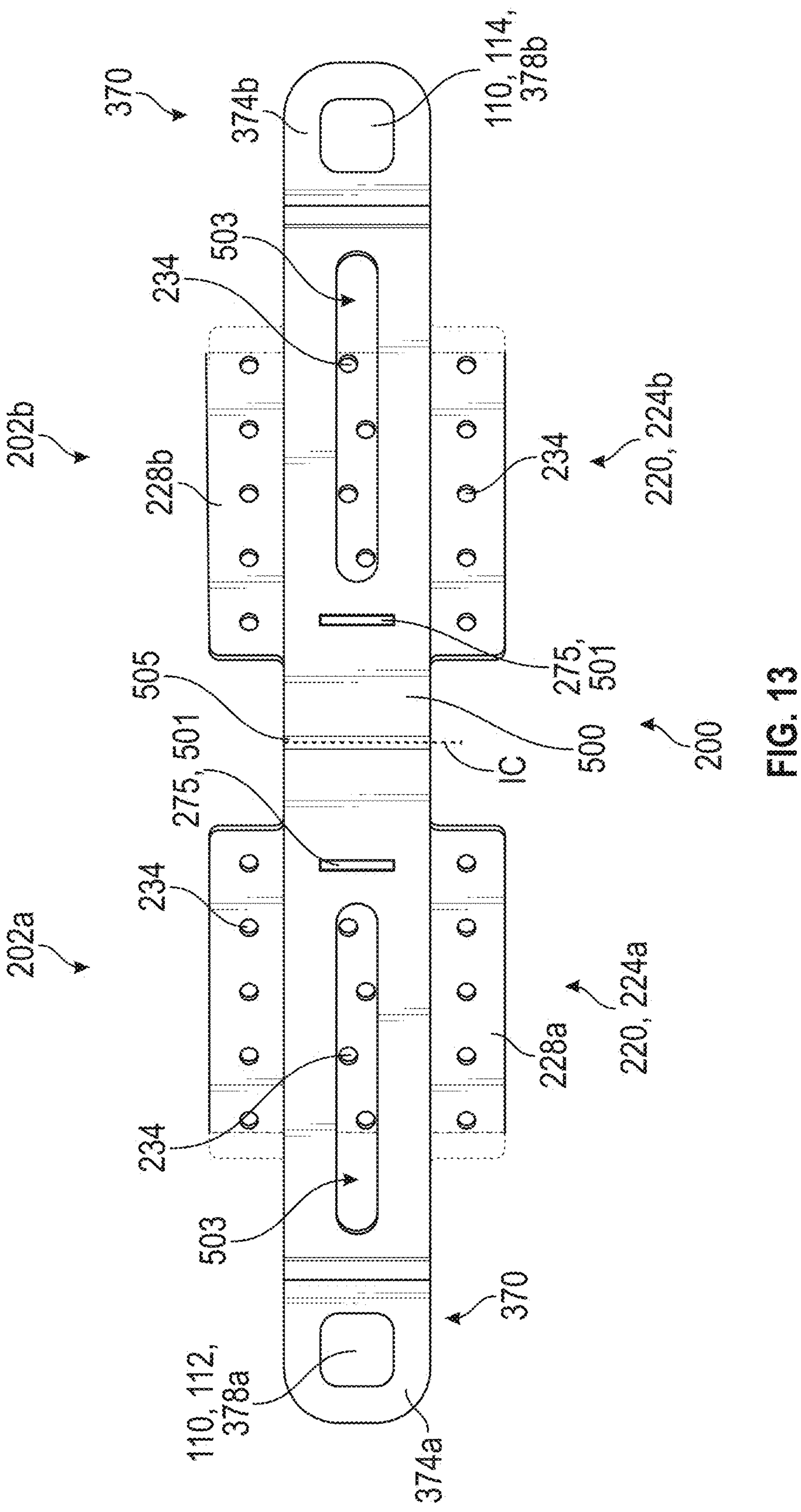
FIG. 13 is a top view of the support bracket assembly of FIG. 1.
Figure 14:
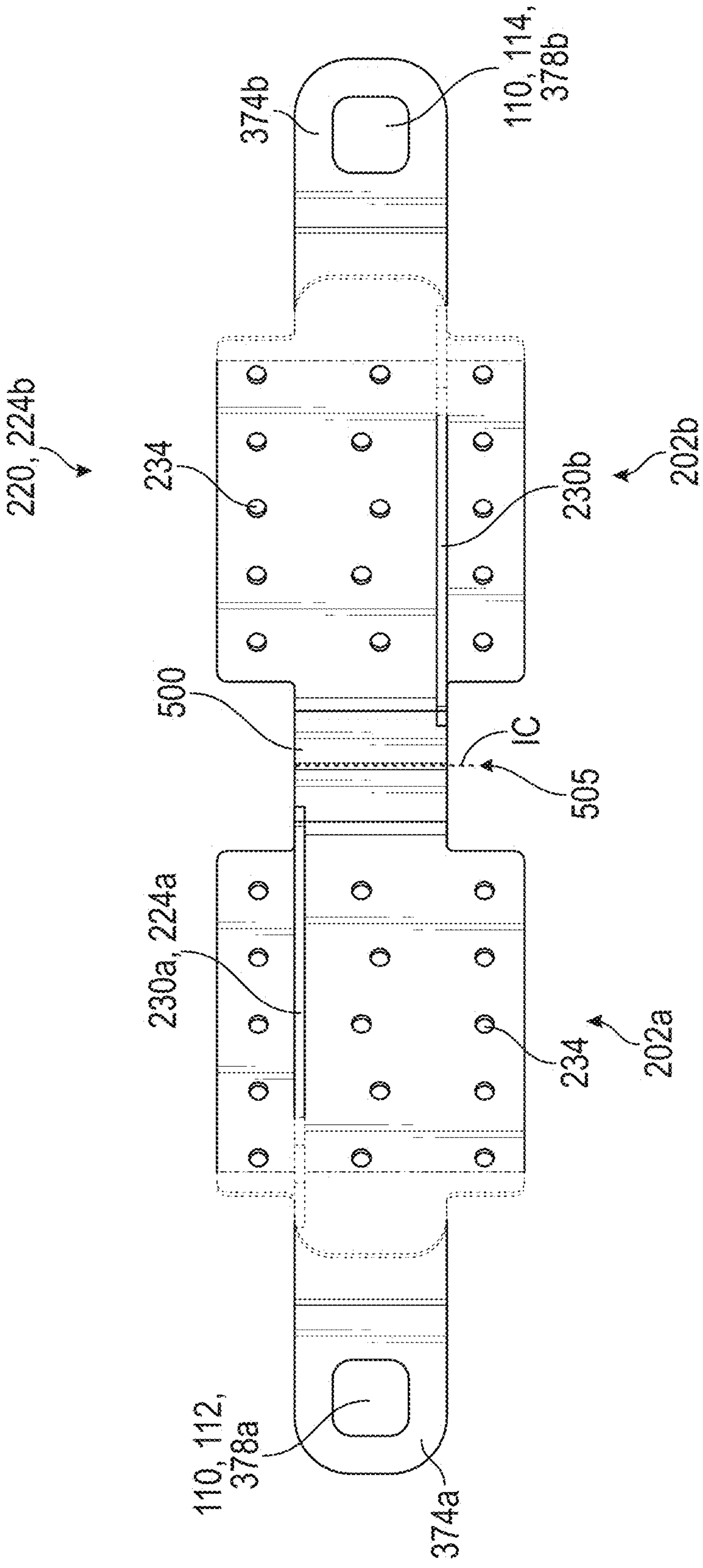
FIG. 14 is a bottom view of the support bracket assembly of FIG. 1.

The purlin support structures 274*a*, 274*b* are integrally formed with the first or upper portions 228*a*, 228*b* of the truss attachment segments 224*a*, 224*b* and is interchangeably connected to the anchor element 500, which permits the manufacturer to reduce the number of parts for manufacture of the support bracket assembly 200. For example, FIGS. 3 and 4 shows two different embodiments of the purlin support structures 274*a*, 274*b* in combination with the first or upper portion 228*a*, 228*b* of the truss attachment segments 224*a*, 224*b*, wherein the first embodiment is configured to be utilized with 1.5 inch purlins and the second embodiment is configured to be utilized with 3.5 inch purlins. This interchangeable configuration is beneficial because: (i) it allows the combination of the purlin support structures 274*a*, 274*b* and the first or upper portions 228*a*, 228*b* to be manufactured separate from the second or vertical portions 230*a*, 230*b* of the truss assembly, which reduces cost and manufacturing complexity, (ii) reduces the total number of parts that need to be kept in stock, (iii) enables changes to the purlin support structures 274*a*, 274*b* and the first or upper portions 228*a*, 228*b* in a quick an effective manner. To enable this interchangeable connection, the purlin support structure 274*a*, 274*b* includes at least one projection 275 that is received within an opening 501 formed in the anchor element 500 between the primary slot 503 and the midpoint apex 505 of the anchor element 500. Once the projections 275 are properly inserted into the openings 501, said projections 275 are welded to the anchor element 500. It should be understood that other methods of coupling, including releasable coupling, the purlin support structures 274*a*, 274*b* to the anchor element 500 are contemplated by this disclosure. As shown in FIG. 13, the primary slot 503 is aligned with a number of apertures 234 to facilitate insertion of elongated fasteners to secure the support bracket 200 to a support surface of the truss assembly.

ii. Second Truss Attachment Portion

Figure 6:
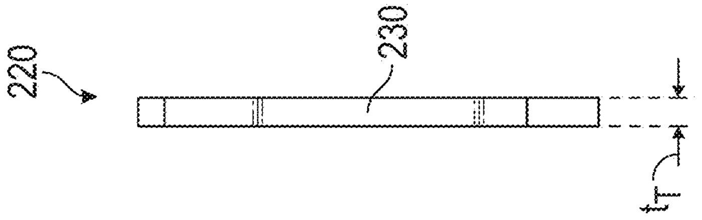
FIG. 6 is an end view of the second truss attachment portion of the truss attachment assembly of the support bracket.

The second or vertical portions 230*a*, 230*b* of the truss attachment segments 224*a*, 224*b* are interchangeably connected to the first or upper portions 228*a*, 228*b*. This interchangeability allows for the reduction of parts and provides the support bracket 200 with modularity that can be utilized in the field to account for trusses have different sizes, mating regions and/or configurations during the installation of the roof on the building. For example, FIGS. 5 and 6 show isolated views of the second or vertical portions 230*a*, 230*b* isolated from the first portions 228*a*, 228*b*. The second portions 230*a*, 230*b* include at least one projection, 231*a*, 231*b* that is received in an aperture 227*a*, 227*b* formed in the first portions 228*a*, 228*b*, respectively. This configuration is beneficial because: (i) it allows the second or vertical portions 230*a*, 230*b* to be manufactured separate from the first or upper portion 228*a*, 228*b*, which reduces cost and manufacturing complexity, (ii) it reduces the total number of parts that need to be kept in stock, (iii) enables changes to the truss attachment segments 224*a*, 224*b* in a quick an effective manner. To enable this interchangeable connectivity, the second or vertical portions 230*a*, 230*b* includes two projections 231*a*, 231*b* received within the aperture 227*a*, 227*b* formed in the first or upper portion 228*a*, 228*b*. Once the projections 231*a*, 231*b* are inserted into the aperture 227*a*, 227*b*, said projections 231*a*, 231*b* of the second or vertical portions 230*a*, 230*b* are welded to the first or upper portion 228*a*, 228*b*. It should be understood that other methods of coupling, including releasable coupling, the first or upper portion 228*a*, 228*b* to the second or vertical portions 230*a*, 230*b* are contemplated by this disclosure.

3. Installation and Use of the Roof Attachment System

Figure 24:
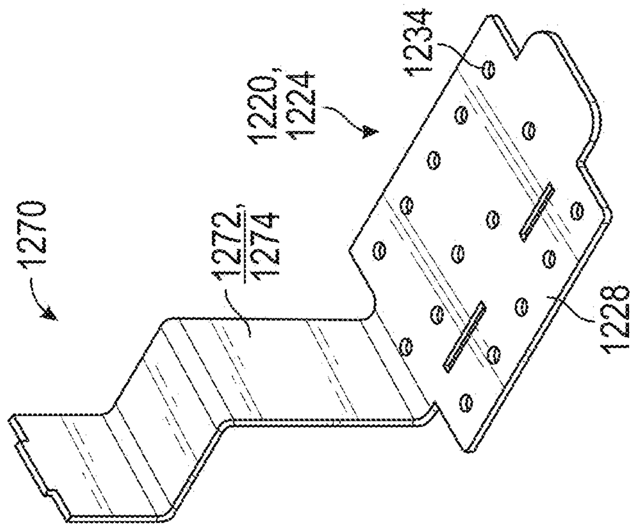
FIG. 24 is a perspective view of a second embodiment of the truss attachment assembly designed for use with 3.5 inch purlin with a 1.5 inch offset.
Figure 23:
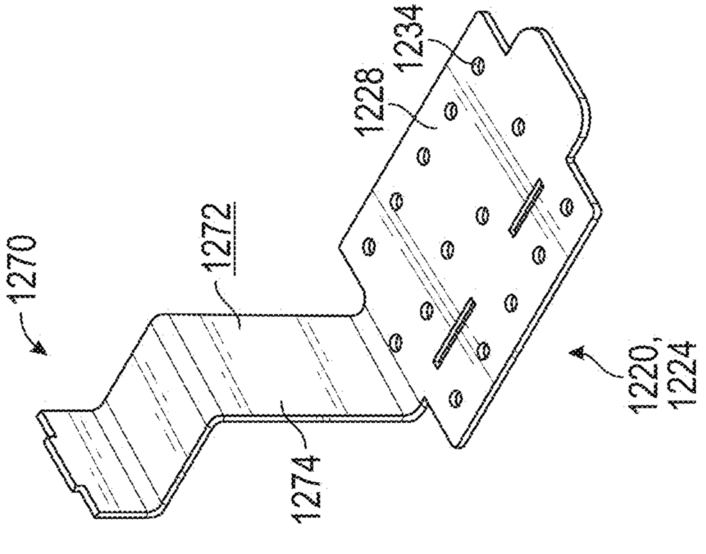
FIG. 23 is a perspective view of a first embodiment of the truss attachment assembly designed for use with 3.5 inch purlin with a 1 inch offset.
Figure 26:
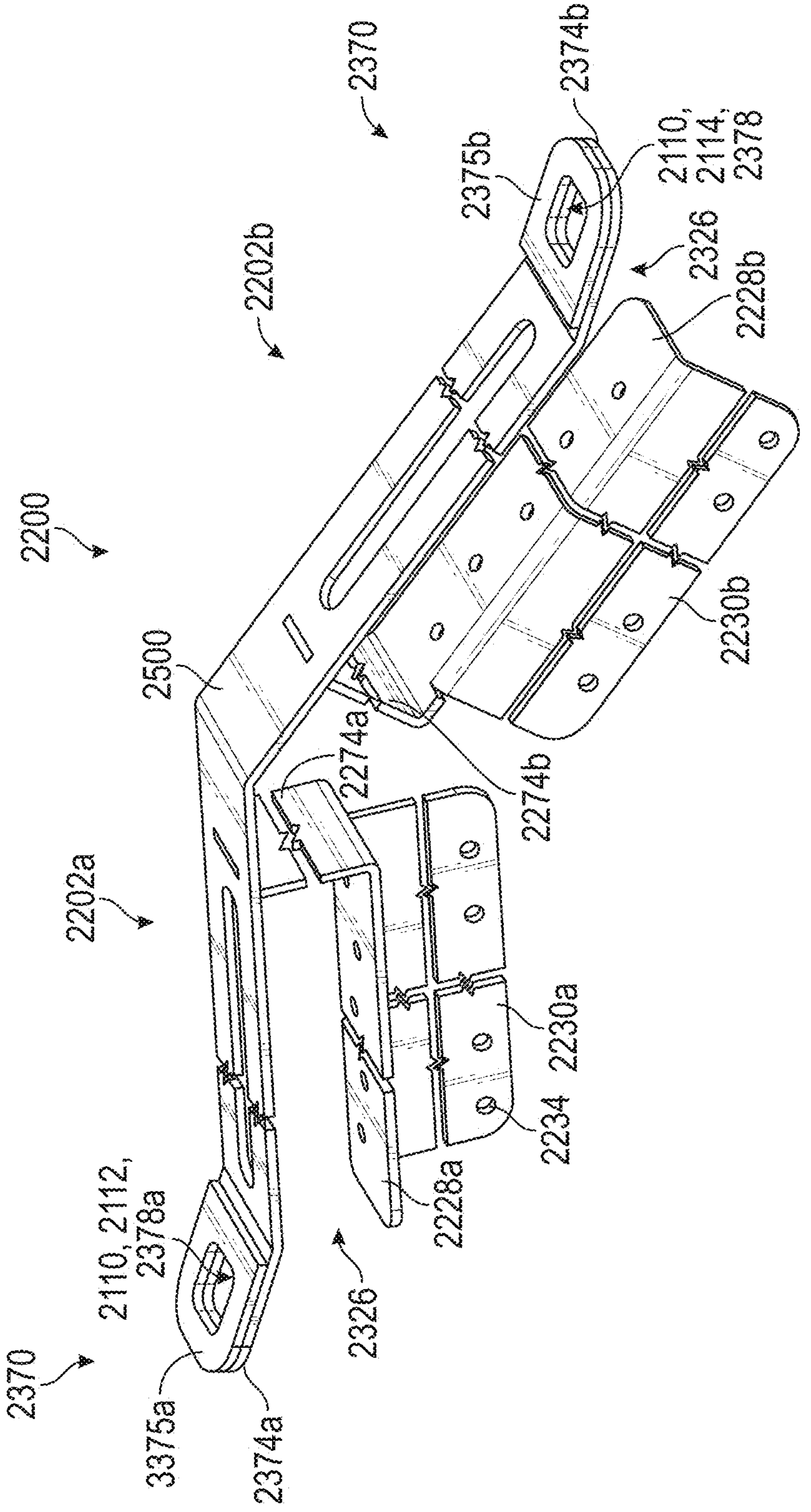
FIG. 26 is a perspective view of a third embodiment of a support bracket assembly of the roof attachment system that includes: (i) an anchor element, and (ii) truss attachment assembly.
Figure 27:
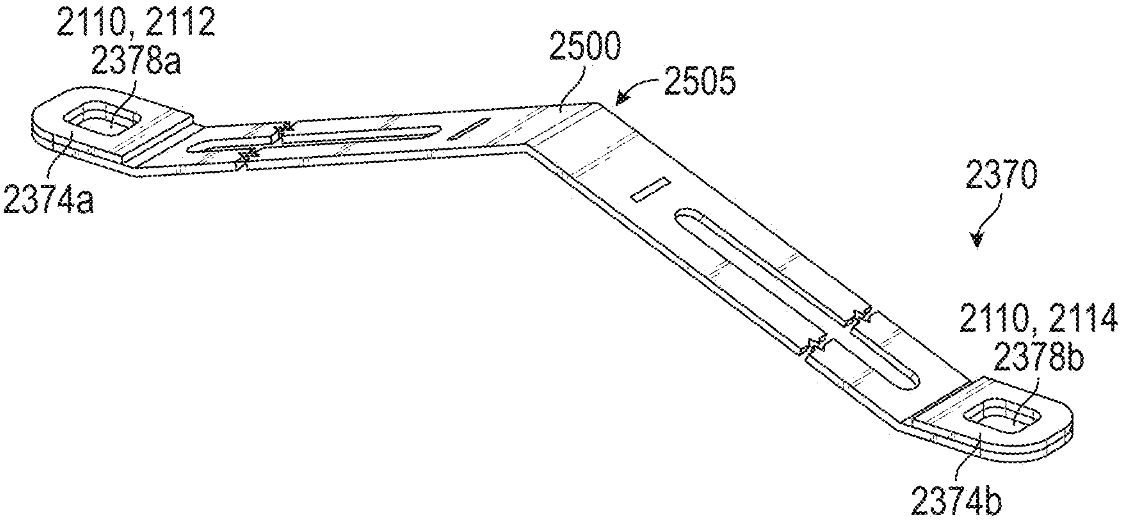
FIG. 27 is a perspective view of the anchor element of the support bracket of FIG. 26.
Figure 28:
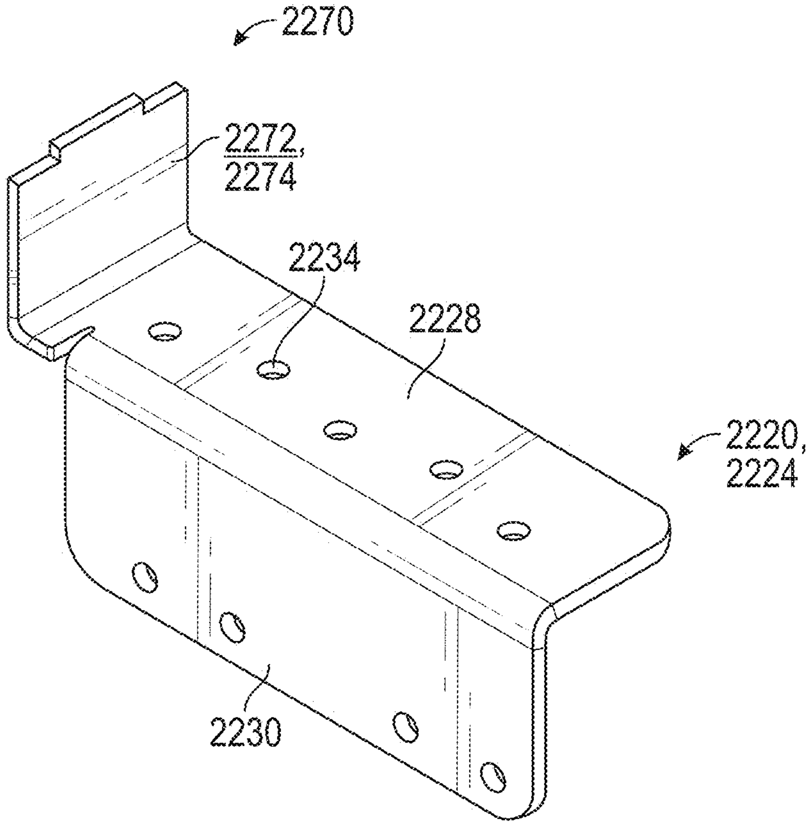
FIG. 28 is a perspective view of a first embodiment of the truss attachment assembly of the support bracket that is designed for use with 1.5 inch purlin.
Figure 29:
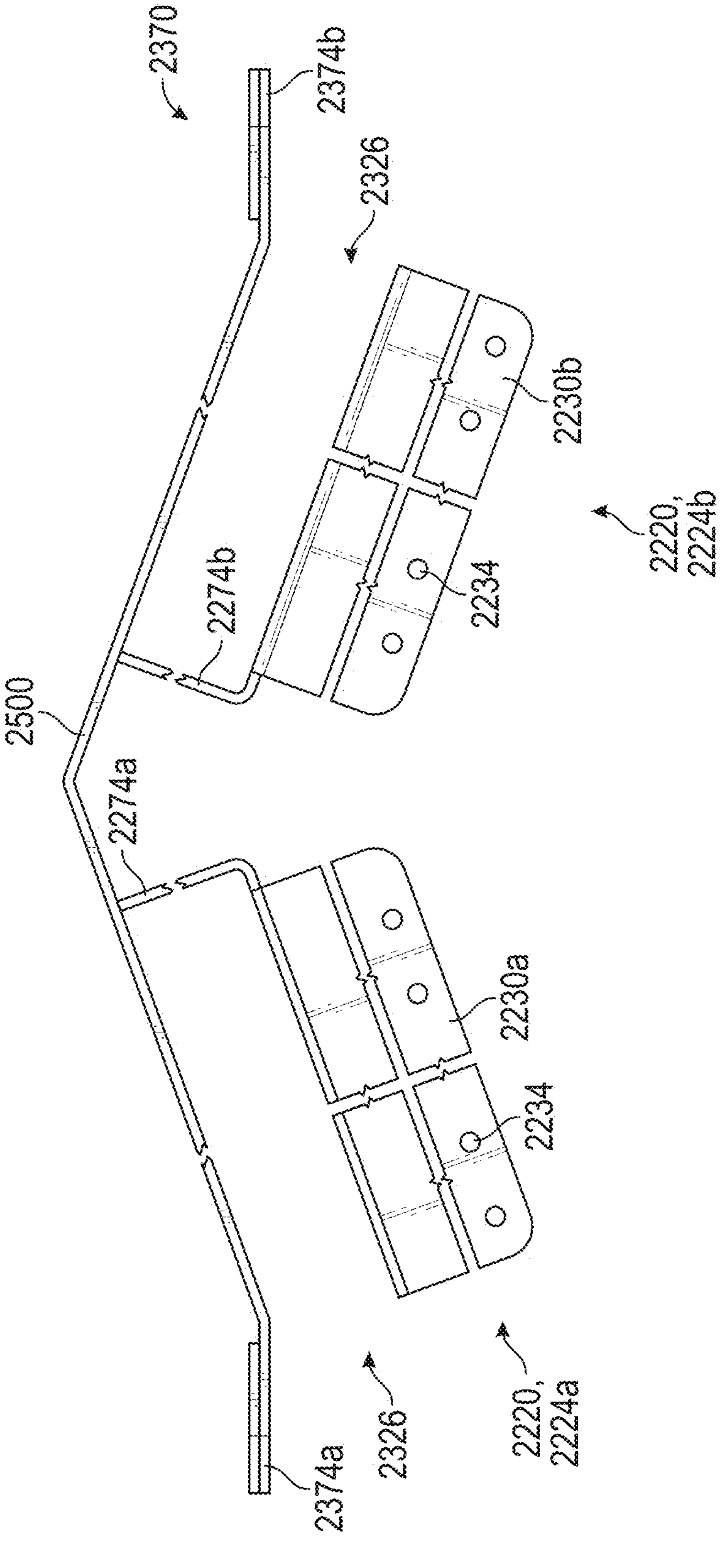
FIG. 29 is a side view of the support bracket assembly of FIG. 26.
Figure 30:
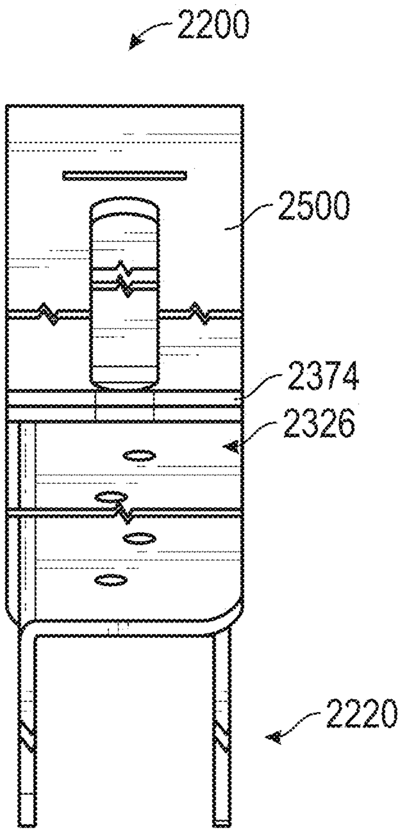
FIG. 30 is a first end view of the support bracket assembly of FIG. 26.
Figure 31:
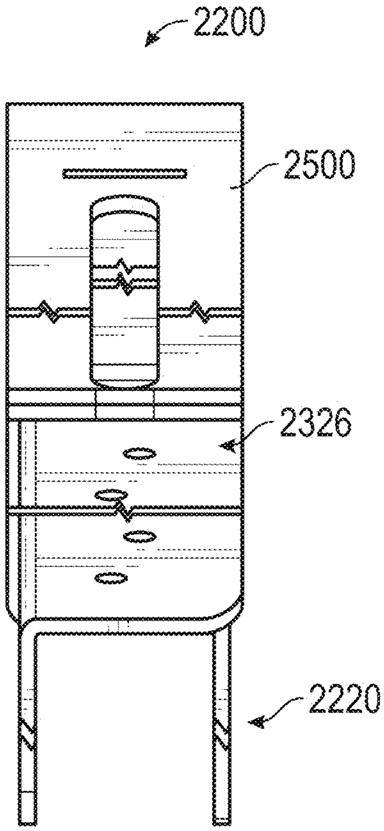
FIG. 31 is a second end view of the support bracket assembly of FIG. 26.
Figure 32:
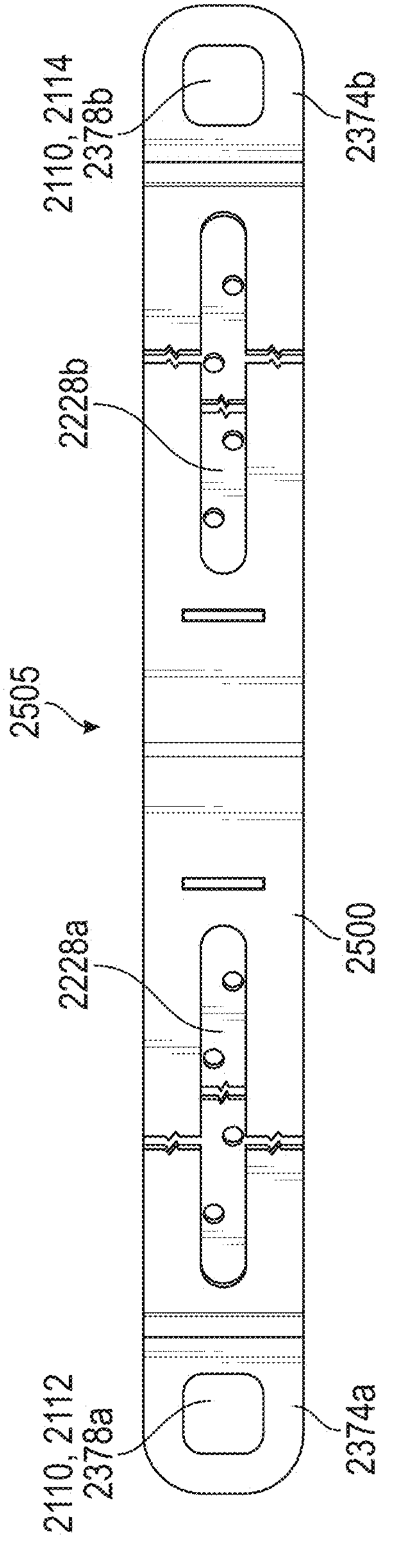
FIG. 32 is a top view of the support bracket assembly of FIG. 26.
Figure 33:
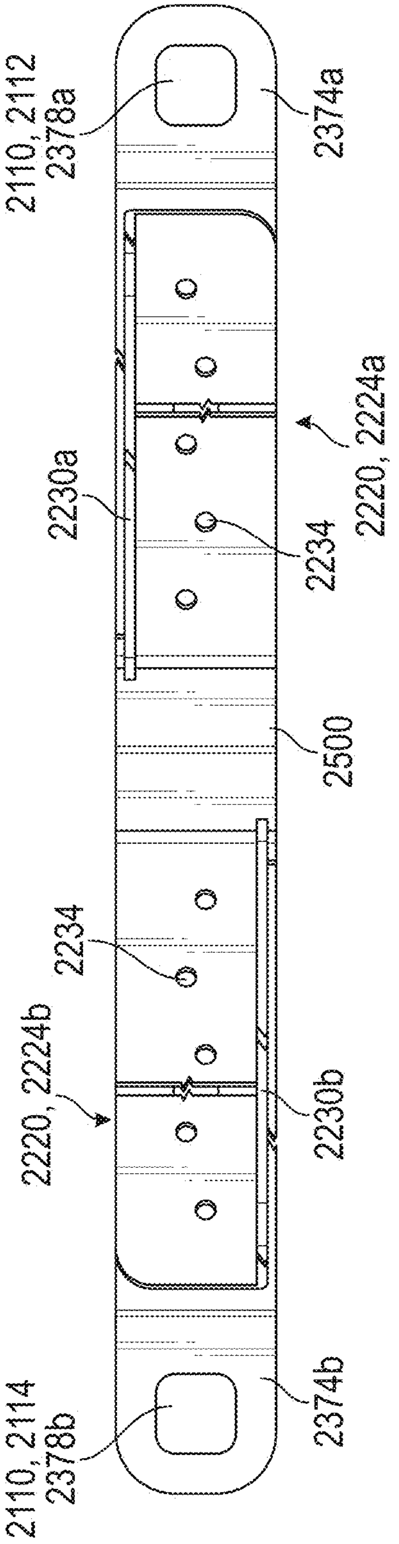
FIG. 33 is a bottom view of the support bracket assembly of FIG. 26.
Figure 34:
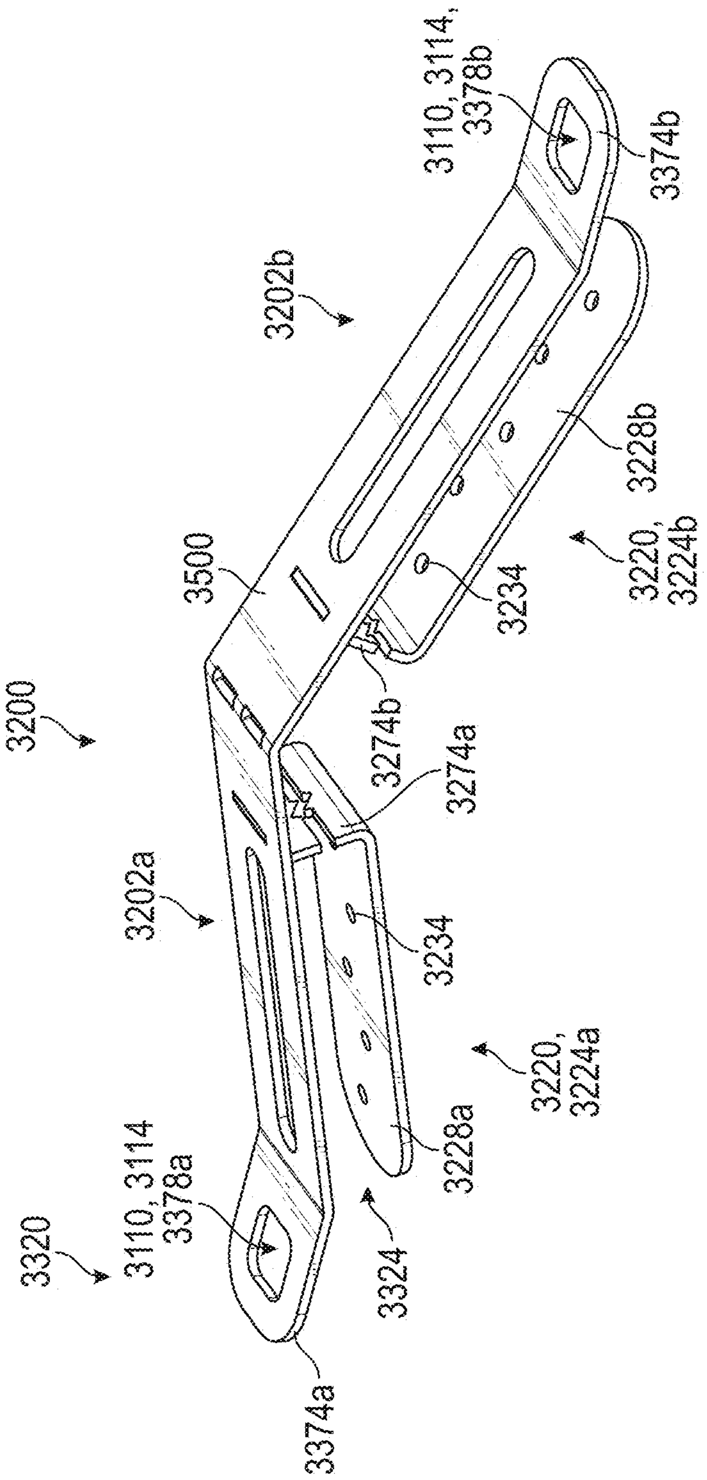
FIG. 34 is a perspective view of a fourth embodiment of a support bracket assembly of the roof attachment system that includes: (i) an anchor element, and (ii) truss attachment assembly.
Figure 35:
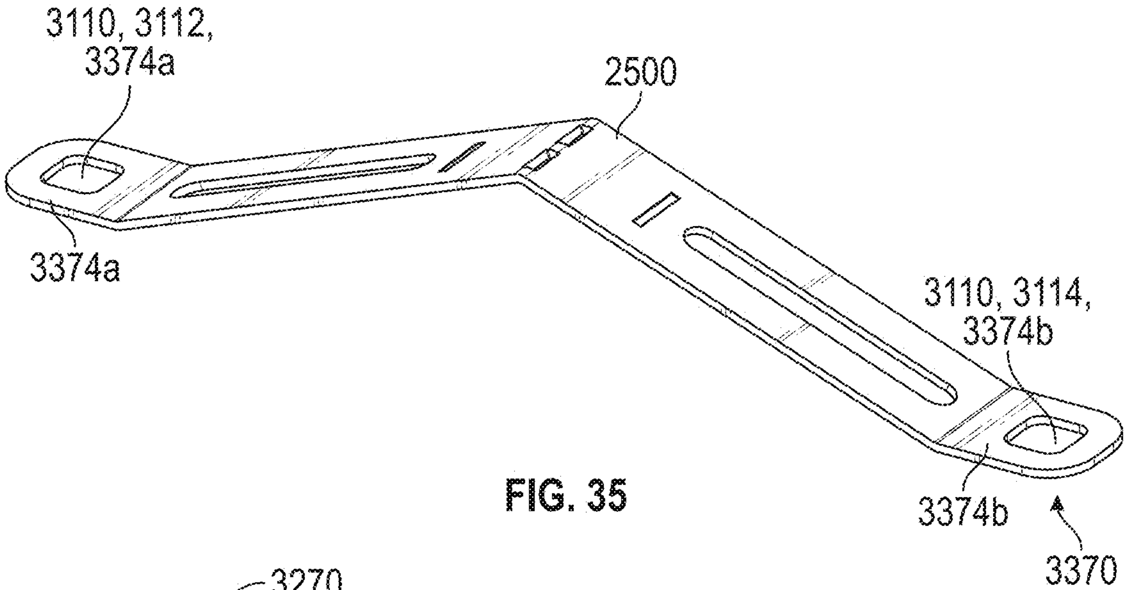
FIG. 35 is a perspective view of the anchor element of the support bracket of FIG. 34.
Figure 36:
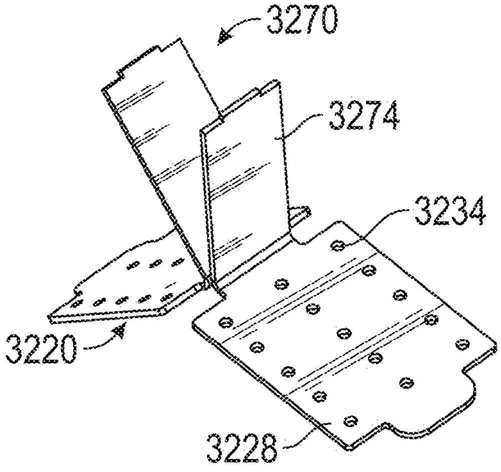
FIG. 36 is a perspective view of a first embodiment of the truss attachment assembly of the support bracket that is designed for use with 3.5 inch purlin.
Figure 37:
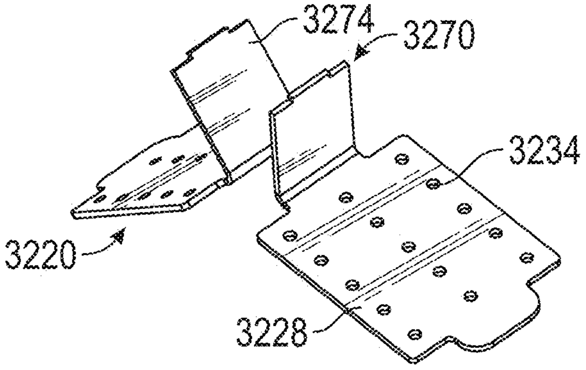
FIG. 37 is a perspective view of a second embodiment of the truss attachment assembly of the support bracket that is designed for use with 1.5 inch purlin.
Figure 38:
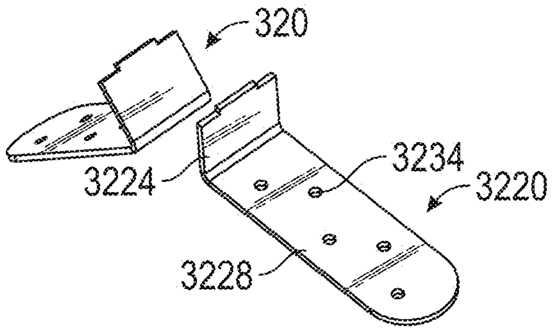
FIG. 38 is a perspective view of a third embodiment of the truss attachment assembly of the support bracket that is designed for use with a sheeted roof.
Figure 39:
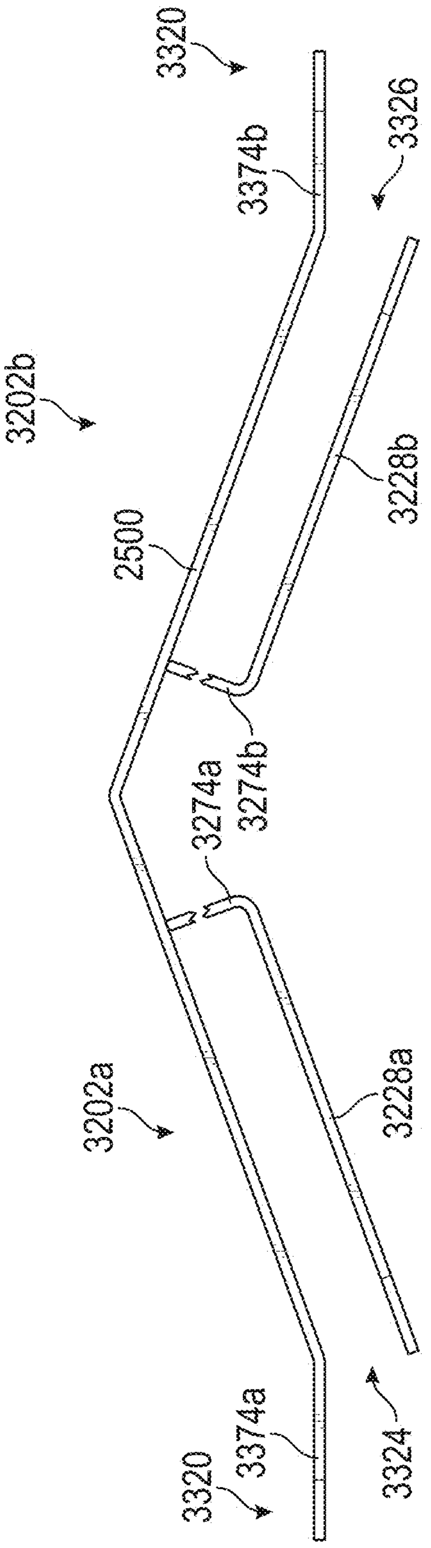
FIG. 39 is a side view of the support bracket assembly of FIG. 34.
Figure 40:
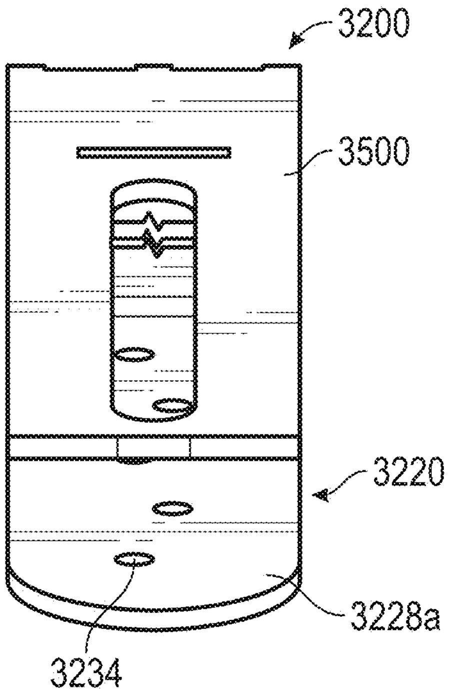
FIG. 40 is a first end view of the support bracket assembly of FIG. 34.
Figure 41:
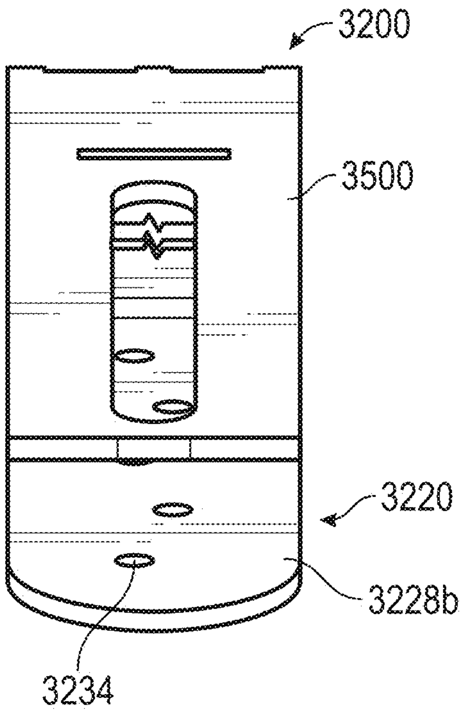
FIG. 41 is a second end view of the support bracket assembly of FIG. 34.
Figure 42:
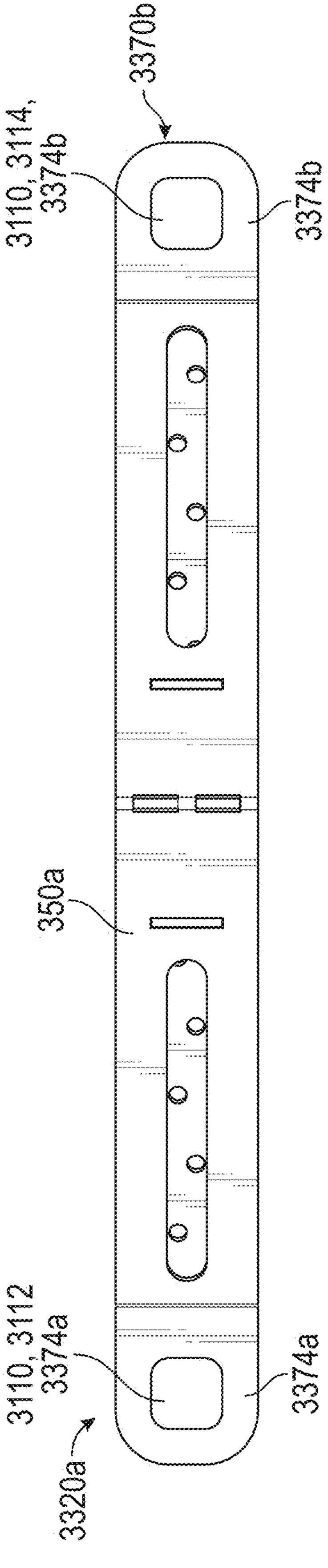
FIG. 42 is a top view of the support bracket assembly of FIG. 34.
Figure 43:
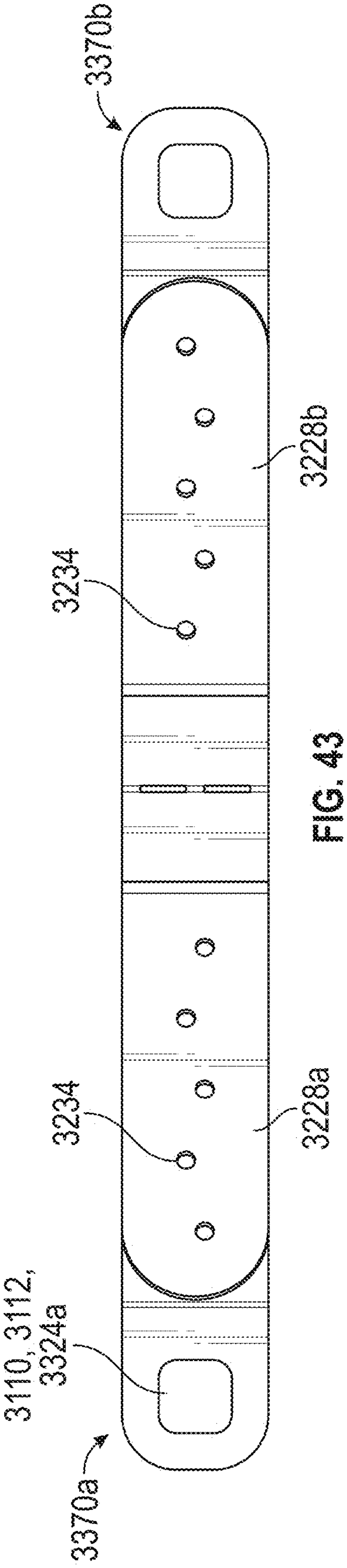
FIG. 43 is a bottom view of the support bracket assembly of FIG. 34.
Figure 44:
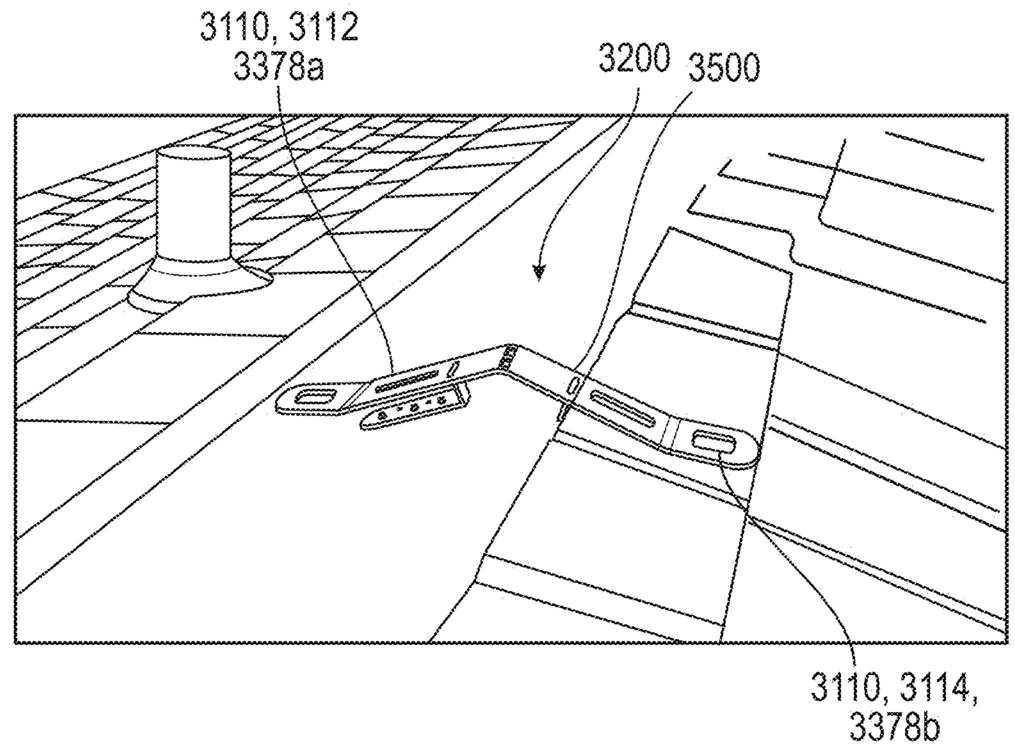
FIG. 44 is a first perspective view of another stage in the process of installing the roof on the building structure, wherein an extent of adjacent shingles (on the right side of the Figure) is installed within a channel of the support bracket of FIG. 34 but the ridge cap has not yet been installed.
Figure 45:
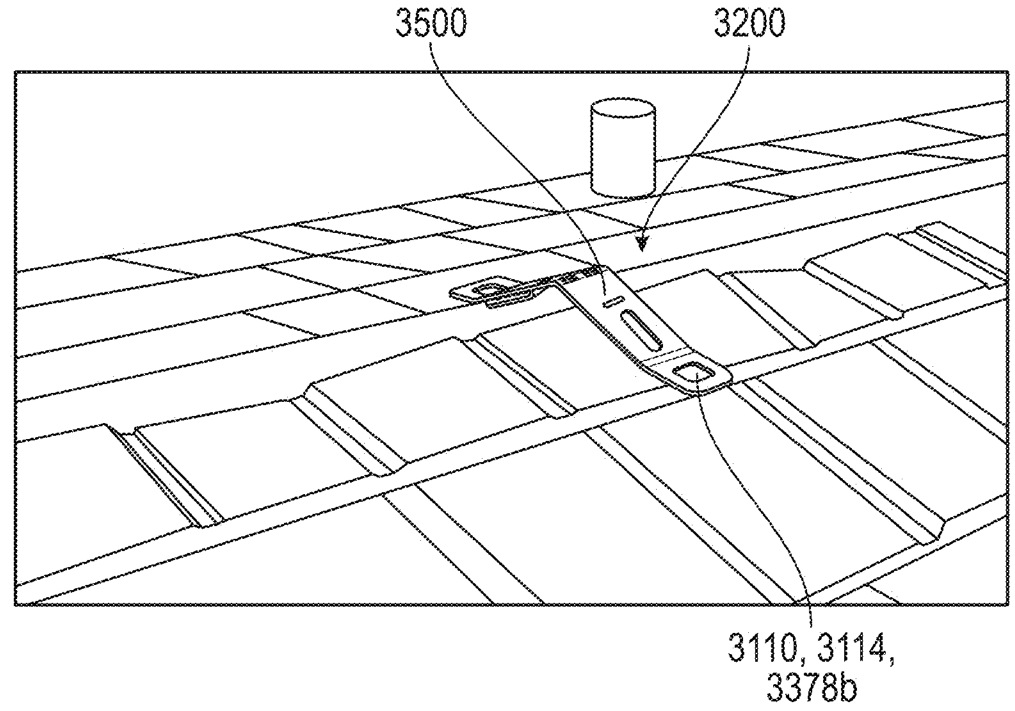
FIG. 45 is a second perspective view of FIG. 44.
Figure 46:
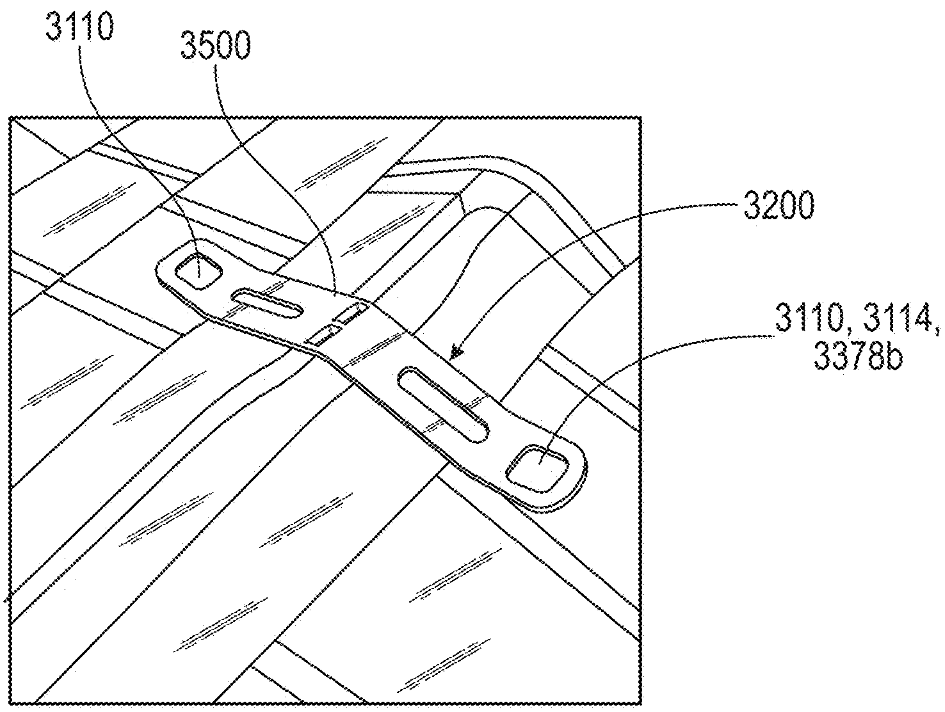
FIG. 46 is a perspective view of another stage in the process of installing the roof on the building structure, wherein an extent of adjacent shingles is installed within both channels of the support bracket of FIG. 34 but the ridge cap has not yet been installed over the support bracket.
Figure 47:
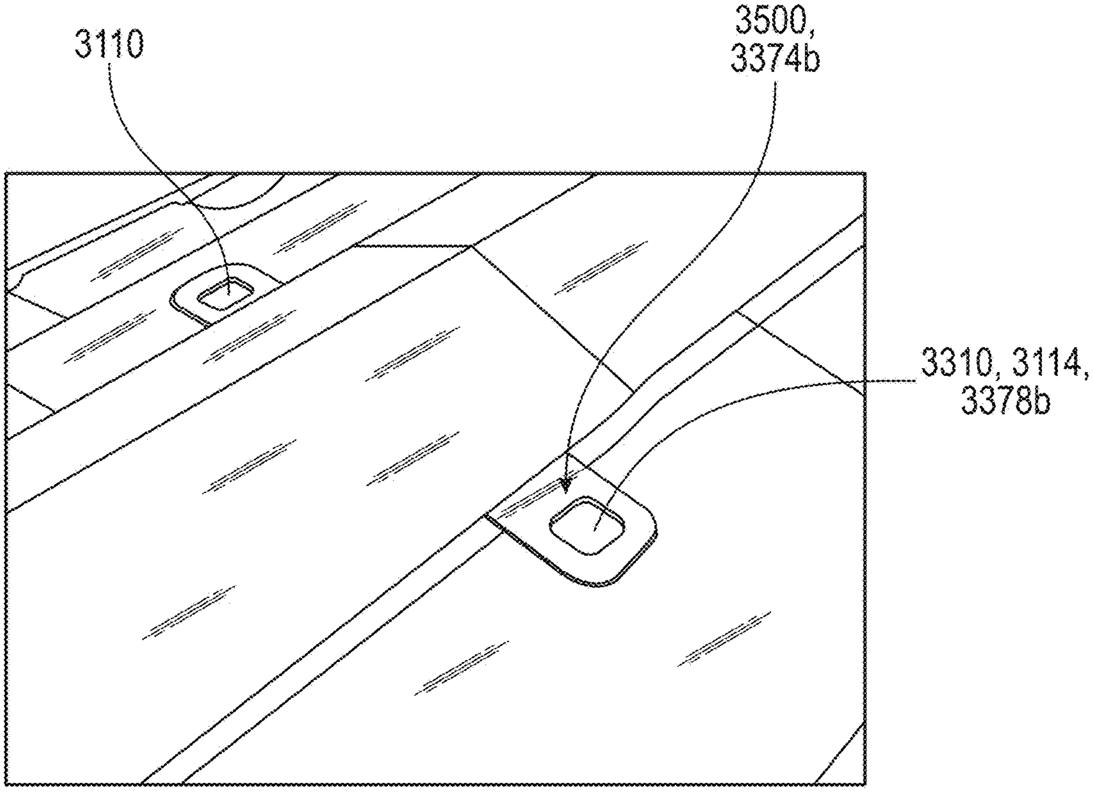
FIG. 47 is a perspective view of another stage in the process of installing the roof on the building structure, wherein an extent of adjacent shingles is installed within both channels of the support bracket of FIG. 34 and a ridge cap is installed over a majority of the support bracket.

The first step in installing the support bracket 200 requires the installer to position an extent of the truss 20 adjacent to first or upper portion 228*a* and second or vertical portion 230*a* of the first truss attachment segment 224*a*. The installer can secure the first truss attachment segment 224*a* to an extent of the truss 20 using the apertures 234 and elongated couplers 236. Once all, or at least some, of the apertures 234 have received elongated couplers 235, the installer rotates or pivots the second truss attachment segment 224*b* such that the first or upper portion 228*b* and second or vertical portion 230*b* of the second truss attachment segment 224*b* is positioned adjacent to an extent of the truss 20. The installer then secures the second truss attachment segment 224*b* to the truss 20 using the apertures 234 and elongated couplers 236. Once the support bracket 200 is coupled to the truss 20, the truss can be installed on the walls 14 of the structure 10. During this installation process, the installer can secure himself to the support bracket 200 prior to when the truss 20 is installed on the structure 10. This configuration helps minimize the risk that is experienced by the installer who is first up on the roof/walls of the structure 10, as shown in FIG. 23. Once all of the trusses 20 are installed within the structure, as shown in FIG. 24, the support bracket 200 provides an elevated point 110. As described above, this elevated point 110 includes two separate anchor points 112, 114 that may be utilized during the installation of the roofing trim 18. This is best shown in FIG. 25, where the installer is coupled to the support bracket 200 via his safety line 950. Once the installer is coupled to the support bracket 200 via his safety line 950, the roof of the structure can be installed.

It should be understood that the use of the disclosed roof attachment system 100 meets the requirements set forth in: (i) Appendix C of Part 1926 of Chapter XVII of Title 29 of the Code of Federal Regulations and (ii) Section 2 of Part II Chapter 4 of Section V of OSHA Technical Manual, both of which are fully incorporated herein by reference. In other words, the disclosed roof attachment system 100 can support at least 5000 pounds without failing. In addition to the above references that are incorporated herein by references, it should be understood that the following documents or papers are also incorporated herein by reference: (i) Title 29 of the Code of Federal Regulations, (ii) OSHA Technical Manual, (iii) OSHA part number 1926, and (iv) fall protection regulations or standards issued by OSHA, governmental bodies, or other agencies.

4. Other Embodiments of the Support Bracket

Figure 22:
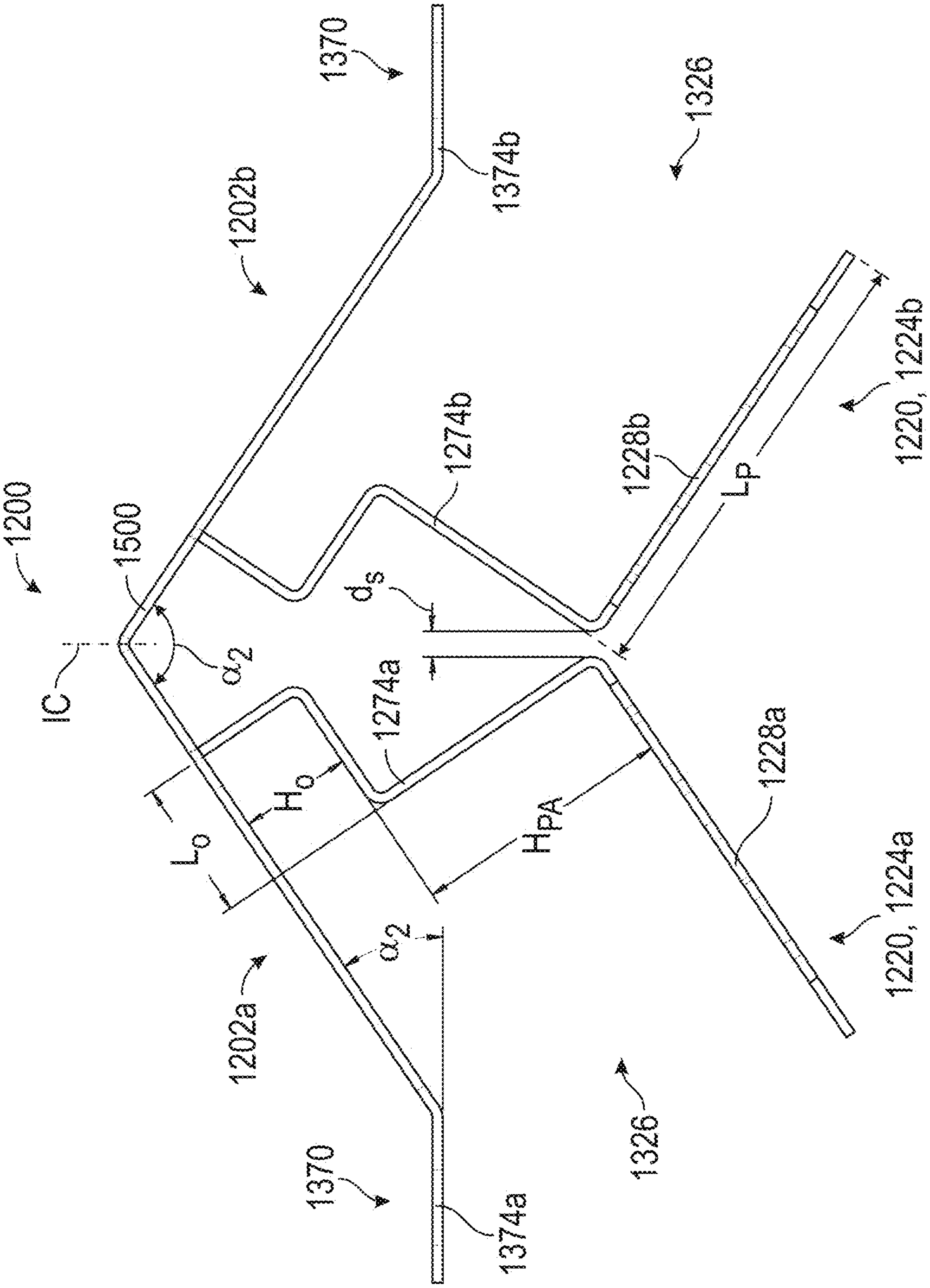
FIG. 22 is a side view of the support bracket assembly of FIG. 21.

As shown in FIGS. 21-25, the second embodiment of the support bracket 1200 is similar to the first embodiment of the support bracket 200 except for the fact that the first truss attachment portion 270 includes an offset. Said offset may be any height ($H_o$) including 1 inch (FIG. 23), 1.5 inches (FIG. 24), or 2 inches (FIG. 25). As shown in FIG. 22, the truss attachment assembly 1220 can have a base or first portion 1128 with a length $L_P$, a purlin support structure height $H_{PA}$, an offset length $L_o$, and an offset height $H_o$.

As shown in FIGS. 26-33, the third embodiment of the support bracket 2200 is similar to the first embodiment of the support bracket 200 except for the first and second purlin support structures 2274*a*, 2274*b* are integrally formed with the first and second truss attachment segments 2224*a*, 2224*b*. Although the truss attachment assembly 2220 integrally formed, in can configured with different sizes and be separately attached to the anchor element 2500. As shown in FIGS. 34-48, the fourth embodiment of the support bracket 3200 is similar to the first embodiment of the support bracket 200 except for the second, lower, or vertical portion 230*a*, 230*b* of the first and second truss attachment segments 224*a*, 224*b* is omitted.

As shown in FIGS. 49-52, the fifth through the eighth embodiments of the support bracket 4200, 5200, 6200, 7200 are similar to the first embodiment of the support bracket 200 except half of the anchor element 500 is omitted. Shown in FIG. 49, a fifth embodiment of the support bracket 4200 includes anchor element 4500 having one arm 4512*a* integrally formed with a first purlin support structure 4274*a* that includes two first truss attachment portions 4228*a*, 4228*b*, where arm 4512*a* extends over first truss attachment portion 4228*a* providing an elevated attachment point 4110. One first truss attachment portion 4228*a* couples to an extent of roof structure and the other base portion 4228*b* couples with another roof portion or wall. Similarly, in FIG. 50, a sixth embodiment of the support bracket 5200 includes anchor element 5500 having one arm 5512*a* integrally formed with a first purlin support structure 5274*a* that includes two first truss attachment portions 5228*a*, 4228*b*, where arm 5512*a* extends over first truss attachment portion 5228*a* providing an elevated attachment point 5110.

Figure 51:
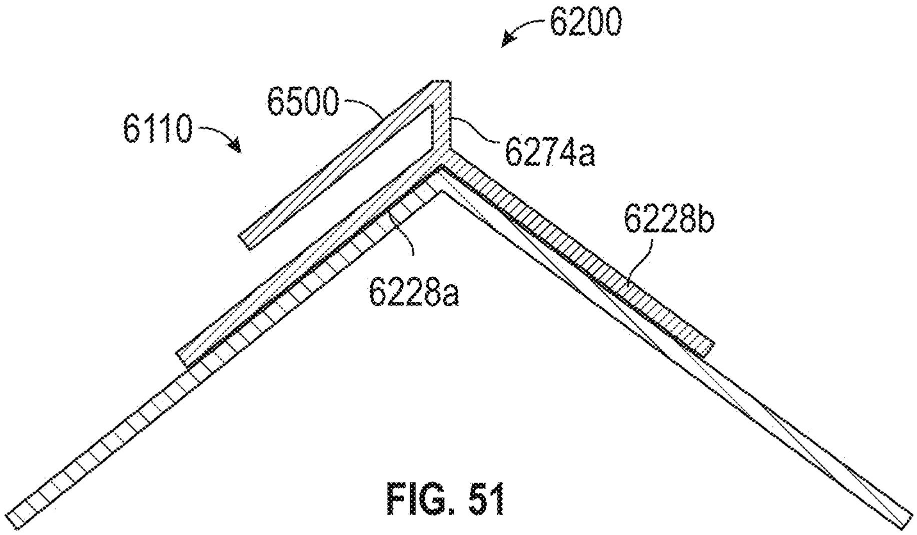
FIG. 51 is a schematic view of a seventh embodiment of a support bracket assembly that includes: (i) an anchor element with a single arm, and (ii) a truss attachment assembly with a pair of first truss attachment portions.

Shown in FIG. 51, a seventh embodiment of the support bracket 6200 includes anchor element 6500 having one arm 6512*a* integrally formed with a first purlin support structure 6274*a* that includes two first truss attachment portions 6228*a*, 6228*b*, where arm 6512*a* extends over first truss attachment portion 6228*a* providing an elevated attachment point 6110. One first truss attachment portion 6228*a* couples to an extent of the roof structure on one side of the apex and the other base portion 6228*b* couples to an extent of the roof structure on the other side of the apex. Similarly, in FIG. 51, a eighth embodiment of the support bracket 7200 includes anchor element 7500 having one arm 7512*a* integrally formed with a first purlin support structure 7274*a* that includes a first truss attachment portions 7228*a* that extends over first truss attachment portion 7228*a* providing an elevated attachment point 7110.

Some of the disclosed versions of the support bracket 200-7200 are designed to be used with the trim system that is described within U.S. Provisional Patent Application Nos. 62/890,005 and 62/916,196, both of which are fully incorporated herein by reference. In particular and as described in greater detail below, the installation order starts with: (i) coupling the support bracket 200 to an extent of the structure 10, namely a portion the roof 12, such as an extent of a truss 20 (ii) coupling the installer's safety line 950 to the support bracket 200, (iii) installing portions of the roof 12 on the support walls 14, (iv) installing the trim 18 of the roof 12, which includes installing the ridge cap 60 over a majority of the support bracket 200, (v) installing the roofing panels 24 within or over the trim 18, while securing the installer's safety line 950 is connected to the support bracket 200. This installation order helps ensure that: (i) a majority of the support bracket 200 remains hidden from exterior view, when the roof 12 is installed, and (ii) the support bracket 200 is directly coupled to an extent of the structure 10 which increases the structural rigidity and durability of the system 100. It should be understood that this installation order is non-limiting and alternative installation orders and configurations (e.g., as described below) are contemplated by this disclosure.

While Figures disclose eight different embodiments of the support bracket 200-7200, it should be understood that there are other embodiments of the support bracket 200-7200 that are contemplated by this disclosure. In an alternative embodiment, the truss coupling means is a resalable coupling means such that the support bracket 200-7200 may be temporarily coupled to the truss 20 and then removed prior to the installation of the roof 12. It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims. For example, the roof attachment system 100 may be used in connection with other parts of the roof 10 other than the ridge. It should be understood that other modifications of side system 100 based on U.S. Pat. No. 11,203,881, which is incorporated herein by reference for all purposes, are also contemplated by this disclosure.

The description provided in the background or other sections here should not be assumed to be prior art merely because it is mentioned in or associated with the background section or described as conventional. The background section may include information that describes one or more aspects of the subject of the technology, and components that are described as conventional may be contemporaneous or other versions of the disclosed technology.

The invention claimed is:

1. An attachment system for use in the installation, maintenance, or repair of a roof on a building structure, the attachment system comprising:

a support bracket that is configured to be permanently attached to an extent of the roof of the building structure, the support bracket including:

at least one first truss attachment segment having a base and a support member extending in a substantially perpendicular direction from one end of the base, the base having a plurality of securement openings and at least one attachment slot formed therethrough, wherein each of said openings are configured to receive an elongated fastener to secure said first truss attachment segment to a first surface of a first frame member of the roof, the support member having an anchor protrusion at a distal end of the support member; and an anchor element having a connecting member that extends between first and second coupling members, the connecting member having a midpoint apex and two arms that extend symmetrically from the apex, each arm having an anchor slot configured to couple with the anchor protrusion of the at least one first truss attachment segment, wherein each of the first and second coupling members has an opening formed therethrough, wherein said opening is configured to provide a first anchor point that an installer can couple a safety line to during the installation, maintenance, or repair.

2. The attachment system of claim 1, wherein the connecting member of the anchor element and the at least one first truss attachment segment are configured to reside under a ridge cap installed on the roof and the first and second coupling members are configured to protrude to the exterior of the ridge cap.

3. The attachment system of claim 1, wherein the connecting member is bendable to adjust an angle at the apex to match a pitch angle of the roof.

4. The attachment system of claim 1, wherein the support bracket includes two first truss attachment segments and the anchor element coupled such that each anchor protrusion of the first truss attachment segments are received into the anchor slots of the arms of the connecting member and welded to secure the first truss attachment segments to the anchor element.

5. The attachment system of claim 1, further comprising a second truss attachment segment having at least one attachment protrusion and a plurality of securement openings formed therethrough, wherein the at least one attachment protrusion configured to couple with the at least one attachment slot of the first truss attachment segment, and each of said openings are configured to receive an elongated fastener to secure the second truss attachment segment to a second surface of a first frame member of the roof.

6. The attachment system of claim 5, wherein the at least one first truss attachment segment and the second truss attachment segment are coupled to form a support structure.

7. The attachment system of claim 6, wherein the at least one attachment protrusion of the second truss attachment segment is positioned within the at least one attachment slot of the at least one first truss attachment segment.

8. The attachment system of claim 6, wherein the support bracket includes two support structures coupled to the anchor element.

9. The attachment system of claim 8, wherein a first portion of one of the support structures overlies the first frame member of the roof and an extent of the roof overlies said first portion of the first support structure.

10. The attachment system of claim 9, wherein an extent of the anchor element overlies both (a) said first portion of the first support structure, and (b) said extent of the roof that overlies said first portion of the first support structure.

11. An attachment system for use in the installation, maintenance, or repair of a roof on a building structure, the attachment system comprising:

a support bracket that is configured to be permanently attached to an extent of the roof of the building structure, the support bracket including:

a first support structure:

a first truss attachment segment having a base and a support member extending in a substantially perpendicular direction from one end of the base, the base having a plurality of securement openings and at least one attachment slot formed therethrough, wherein each of said openings are configured to receive an elongated fastener to secure said first truss attachment segment to a first surface of a first frame member of the roof, the support member having an anchor protrusion at a distal end of the support member; and a second truss attachment segment having at least one attachment protrusion and a plurality of securement openings formed therethrough, wherein the at least one attachment protrusion is configured to couple with the at least one attachment slot of the first truss attachment segment, and each of said openings are configured to receive an elongated fastener to secure the second truss attachment segment to a second surface of a first frame member of the roof.

12. The attachment system of claim 11, wherein the at least one attachment protrusion of the second truss attachment segment is coupled to the first truss attachment segment at the at least one attachment slot, and welded together.

13. The attachment system of claim 12, wherein the support bracket includes a second support structure having:

a first truss attachment segment having a base and a support member extending in a substantially perpendicular direction from one end of the base, the base having a plurality of securement openings and at least one attachment slot formed therethrough, wherein each of said openings are configured to receive an elongated fastener to secure said first truss attachment segment to a first surface of a first frame member of the roof, the support member having an anchor protrusion at a distal end of the support member; and a second truss attachment segment having at least one attachment protrusion and a plurality of securement openings formed therethrough, wherein the at least one attachment protrusion configured to couple with the at least one attachment slot of the first truss attachment segment, and each of said openings are configured to receive an elongated fastener to secure the second truss attachment segment to a second surface of a first frame member of the roof.

14. The attachment system of claim 13, wherein the support bracket includes an anchor element coupled to the first support structure and the second support structure, and wherein the anchor element has a connecting structure that extends between first and second coupling members, the connecting member having a midpoint apex and two arms that extend symmetrically from the apex, each arm having an anchor slot configured to couple with the anchor protrusion of the first truss attachment segment, wherein each of the first and second coupling members has an opening formed therethrough, wherein said openings are configured to provide first and second anchor points that an installer can couple a safety line to during the installation, maintenance, or repair.

15. The attachment system of claim 14, wherein the first anchor point and the second anchor point are in an opposed positional relationship and an apex of the roof is located between the first and second anchor points.

16. The attachment system of claim 11, wherein the support bracket meets Appendix C of Part 1926 of Chapter XVII of Title 29 of the Code of Federal Regulations and Section 2 of Part II Chapter 4 of Section V of OSHA Technical Manual.

17. The attachment system of claim 11, wherein the support bracket is configured to be coupled to a truss prior to the truss being installed to the building structure.

18. A modular support bracket system, comprising a universal anchor element configured to couple with a pair of support structures, wherein:

the anchor element includes a connecting member that extends between first and second coupling members, the connecting member having a midpoint apex and two arms that extend symmetrically from the apex, each arm having an anchor slot configured to couple with an anchor protrusion of a first truss attachment segment, wherein each of the first and second coupling members has an opening formed therethrough, wherein said openings are configured to provide first and second anchor points that an installer can couple a safety line to during the installation, maintenance, or repair; and each support structure includes a first truss attachment segment having a base and a support member extending in a substantially perpendicular direction from one end of the base, the base having a plurality of securement openings and at least one attachment slot formed therethrough, wherein each of said openings are configured to receive an elongated fastener to secure said first truss attachment segment to a first surface of a first frame member of the roof, the support member having an anchor protrusion at a distal end of each respective support structure.

* * * * *